(12) United States Patent
Mortensen et al.

(10) Patent No.: US 10,964,339 B2
(45) Date of Patent: Mar. 30, 2021

(54) LOW-COMPLEXITY VOICE ACTIVITY DETECTION

(71) Applicant: Analog Devices International Unlimited Company, Limerick (IE)

(72) Inventors: Mikael Mortensen, Milpitas, CA (US); Kim Spetzler Berthelsen, Koge (DK); Robert Adams, Acton, MA (US); Andrew Milia, Cambridge, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/515,018

(22) Filed: Jul. 17, 2019

(65) Prior Publication Data

US 2019/0355383 A1 Nov. 21, 2019

Related U.S. Application Data

(63) Continuation of application No. 15/321,743, filed as application No. PCT/US2015/039406 on Jul. 7, 2015, now Pat. No. 10,360,926.

(Continued)

(51) Int. Cl.
*G10L 17/00* (2013.01)
*G10L 25/78* (2013.01)
(Continued)

(52) U.S. Cl.
CPC ............. *G10L 25/78* (2013.01); *G10L 15/02* (2013.01); *G10L 25/15* (2013.01); *G10L 25/18* (2013.01);
(Continued)

(58) Field of Classification Search
None
See application file for complete search history.

(56) References Cited

U.S. PATENT DOCUMENTS

| 4,063,035 A | ‡ | 12/1977 | Appelman | ............. | G09B 19/04 |
| | | | | | 704/21 |
| 5,214,693 A | ‡ | 5/1993 | Chujo | .................... | H04Q 1/453 |
| | | | | | 327/47 |

(Continued)

OTHER PUBLICATIONS

Office Action (OA1) issued in CN Patent Application Serial No. 201610943628.4 dated Dec. 4, 2019, 11 pages.

(Continued)

*Primary Examiner* — Richard Z Zhu
(74) *Attorney, Agent, or Firm* — Patent Capital Group

(57) ABSTRACT

Many processes for audio signal processing can benefit from voice activity detection, which aims to detect the presence of speech as opposed to silence or noise. The present disclosure describes, among other things, leveraging energy-based features of voice and insights on first and second formant frequencies of vowels to provide a low-complexity and low-power voice activity detector. A pair of two channels is provided whereby each channel is configured to detect voice activity in respective frequency bands of interest. Simultaneous activity detected in both channels can be a sufficient condition for determining that voice is present. More channels or pairs of channels can be used to detect different types of voices to improve detection and/or to detect voices present in different audio streams.

20 Claims, 23 Drawing Sheets

Related U.S. Application Data

(60) Provisional application No. 62/147,503, filed on Apr. 14, 2015, provisional application No. 62/059,275, filed on Oct. 3, 2014, provisional application No. 62/022,749, filed on Jul. 10, 2014.

(51) Int. Cl.
| | | |
|---|---|---|
| *G10L 25/18* | (2013.01) | |
| *G10L 25/15* | (2013.01) | |
| *G10L 15/02* | (2006.01) | |
| *G10L 25/81* | (2013.01) | |
| *G10L 25/84* | (2013.01) | |
| *G10L 25/87* | (2013.01) | |

(52) U.S. Cl.
CPC .............. *G10L 25/81* (2013.01); *G10L 25/84* (2013.01); *G10L 25/87* (2013.01)

(56) References Cited

U.S. PATENT DOCUMENTS

| | | | | |
|---|---|---|---|---|
| 5,457,769 | A ‡ | 10/1995 | Valley | G10L 25/78 704/21 |
| 5,854,808 | A ‡ | 12/1998 | Peponides | G10L 25/78 375/224 |
| 5,872,469 | A ‡ | 2/1999 | Nestler | G11C 27/026 327/39 |
| 8,208,656 | B2 ‡ | 6/2012 | Feng | H04R 3/005 381/104 |
| 8,374,861 | B2 ‡ | 2/2013 | Hetherington | G10L 21/0208 704/226 |
| 8,717,094 | B2 ‡ | 5/2014 | Nestler | H03K 5/00 327/55 |
| 8,744,844 | B2 ‡ | 6/2014 | Klein | G10L 21/0208 704/22 |
| 8,909,522 | B2 * | 12/2014 | Shperling | G10L 25/78 704/233 |
| 9,076,447 | B2 ‡ | 7/2015 | Nandy | G10L 19/002 |
| 9,165,567 | B2 ‡ | 10/2015 | Visser | G10L 25/78 |
| 9,349,386 | B2 ‡ | 5/2016 | Adams | G10L 25/93 |
| 9,401,160 | B2 * | 7/2016 | Sehlstedt | G10L 25/87 |
| 9,406,313 | B2 ‡ | 8/2016 | Ryan | G10L 25/78 |
| 9,478,234 | B1 ‡ | 10/2016 | Nandy | G10L 15/30 |
| 9,502,028 | B2 ‡ | 11/2016 | Nandy | G10L 19/002 |
| 9,542,933 | B2 ‡ | 1/2017 | Mortensen | G10L 15/02 |
| 9,558,755 | B1 ‡ | 1/2017 | Laroche | G10L 21/02 |
| 9,633,654 | B2 ‡ | 4/2017 | Raychowdhury | G10L 25/84 |
| 9,711,166 | B2 ‡ | 7/2017 | Qutub | H04R 3/00 |
| 9,712,923 | B2 ‡ | 7/2017 | Furst | H04R 3/00 |
| 9,773,511 | B2 ‡ | 9/2017 | Sehlstedt | G10L 25/78 |
| 9,830,080 | B2 ‡ | 11/2017 | Qutub | G06F 3/0604 |
| 9,830,913 | B2 ‡ | 11/2017 | Thomsen | G10L 15/22 |
| 10,020,008 | B2 ‡ | 7/2018 | Dai | H04R 3/00 |
| 10,045,140 | B2 ‡ | 8/2018 | Rossum | H04R 29/004 |
| 2002/0075856 | A1 ‡ | 6/2002 | LeBlanc | G10L 25/78 370/352 |
| 2003/0053639 | A1 * | 3/2003 | Beaucoup | G10L 21/0208 381/92 |
| 2003/0061042 | A1 ‡ | 3/2003 | Garudadri | G10L 15/30 704/254 |
| 2006/0015331 | A1 * | 1/2006 | Hui | G10L 21/0272 704/227 |
| 2006/0074676 | A1 ‡ | 4/2006 | Deng | G10L 13/02 704/261 |
| 2008/0147404 | A1 * | 6/2008 | Liu | G10L 15/005 704/256.2 |
| 2009/0089236 | A1 ‡ | 4/2009 | Lamprecht | G06N 7/005 706/46 |
| 2009/0192788 | A1 ‡ | 7/2009 | Yoshioka | G10L 25/78 704/206 |
| 2011/0208520 | A1 ‡ | 8/2011 | Lee | G10L 25/78 704/233 |
| 2013/0231932 | A1 ‡ | 9/2013 | Zakarauskas | G10L 25/78 704/23 |
| 2014/0012573 | A1 ‡ | 1/2014 | Hung | G06F 1/3215 704/233 |
| 2014/0236582 | A1 ‡ | 8/2014 | Raychowdhury | G10L 25/84 704/205 |
| 2014/0309992 | A1 * | 10/2014 | Carney | G10L 25/15 704/209 |
| 2015/0269954 | A1 ‡ | 9/2015 | Ryan | G10L 25/78 704/233 |
| 2015/0350760 | A1 ‡ | 12/2015 | Nandy | G10L 15/00 381/11 |
| 2017/0116980 | A1 ‡ | 4/2017 | Zhang | G10L 21/0264 |
| 2017/0154620 | A1 ‡ | 6/2017 | Berthelsen | G10L 15/16 |
| 2017/0154636 | A1 ‡ | 6/2017 | Geiger | G10L 21/0316 |
| 2017/0194001 | A1 ‡ | 7/2017 | Mortensen | G10L 15/02 |
| 2018/0144740 | A1 ‡ | 5/2018 | Laroche | G10L 15/04 |
| 2018/0174574 | A1 ‡ | 6/2018 | Laroche | G10L 15/08 |
| 2018/0315416 | A1 ‡ | 11/2018 | Berthelsen | G10L 25/51 |
| 2018/0317019 | A1 ‡ | 11/2018 | Furst | G06F 1/3215 |

OTHER PUBLICATIONS

Melikyan et al., *The Correlated Level Shifting as a Gain Enhancement Technique for Comparator Based Integrators*, ResearchGate, Conference Paper, Feb. 2014, 5 pages.

Tabasy et al., *Sequential Correlated Level Shifting: A Switched-Capacitor Approach for High-Accuracy Systems*, IEEE Transactions on Circuits and Systems—II: Express Briefs, vol. 60, No. 12, Dec. 2013, 5 pages.

\* cited by examiner
‡ imported from a related application

VAD Bottom Tracker

| Addr | Name | Notes |
|---|---|---|
| 0x00 | zero | |
| 0x01 | one | |
| 0x02 | audio_input | |
| 0x03 | audio_input_z1 | |
| 0x04 | audio_input_z2 | |
| 0x05 | biquad_0 | |
| 0x06 | biquad_z1_0 | |
| 0x07 | biquad_z2_0 | |
| 0x08 | biquad_a1_0 | |
| 0x09 | biquad_a2_0 | |
| 0x0A | biquad_b0_0 | |
| 0x0B | biquad_b1_0 | |
| 0x0C | biquad_b2_0 | |
| 0x0D | biquad_1 | |
| 0x0E | biquad_z1_1 | |
| 0x0F | biquad_z2_1 | |
| 0x10 | biquad_a1_1 | |
| 0x11 | biquad_a2_1 | |
| 0x12 | biquad_b0_1 | |
| 0x13 | biquad_b1_1 | |
| 0x14 | biquad_b2_1 | |
| 0x15 | avg_factor | |
| 0x16 | downsample | |
| 0x17 | trk_top_no_accel_cnt | |
| 0x18 | trk_bot_no_accel_cnt | |
| 0x19 | trk_accel_factor | |
| 0x1A | trk_top_fall_rate | |
| 0x1B | trk_top_rise_rate | |
| 0x1C | trk_bot_rise_rate | |
| 0x1D | trk_bot_fall_rate | |
| 0x1E | speech_thresh | |
| 0x1F | speech | writing speech causes top, bot to be written to tracker buffer |
| 0x20 | noise_thresh | |
| 0x21 | mod_index | |
| 0x22 | avg_hi | writeable from rd_a |
| 0x23 | avg_lo | writeable from rd_b |
| 0x24 | gp0 | |
| 0x25 | gp1 | |
| 0x26 | gp2 | |
| 0x27 | gp3 | |
| 0x28 | priority encoder | read only |
| 0x29 | down_counter | autodecrement on next sample |
| 0x30 | lg2 | on lg2 op: lg2 = lg2<<1 | 2bit |
| 0x31 | top | |
| 0x32 | top_cnt | |
| 0x33 | bot | |
| 0x34 | bot_cnt | |

FIGURE 25

| opcode | waddr | raddr_a | raddr_b | raddr_c |
|--------|-------|---------|---------|---------|
| 8 | 6 | 6 | 6 | 6 |

0000_0000 MULADD
0000_0001 MULADD_WAIT
0000_0010 MULADD_NXT
0000_0100 MULSUB
0000_0101 MULSUB_WAIT

0000_0110 MAX
0000_0111 MIN

0000_1000 AVG_SUB_AVG
0000_1001 AVG_ADD_REG

0000_1010 SHIFT_LEFT_ADD
0000_1011 SHIFT_RIGHT_ADD
0000_1100 SHIFT_LEFT_SUB
0000_1101 SHIFT_RIGHT_SUB

0000_1110 LD_IMM

0000_1111 LOG2_MANT

001x_xxxx BEQZ
010x_xxxx BNEG
011x_xxxx BLTE
1xxx_xxxx BR_IMM

FIGURE 26

LOW-COMPLEXITY VOICE ACTIVITY DETECTION

CROSS-REFERENCE TO RELATED APPLICATIONS

This application claims priority to and receives benefit of U.S. Non-Provisional patent application Ser. No. 15/321,743, which is a 371 National Phase Application of PCT Application PCT/US2015/039406. The PCT Application claims priority to and receives benefit of U.S. Provisional Patent Application 62/022,749 titled "LOW-COMPLEXITY VOICE ACTIVITY DETECTION" (filed on Jul. 10, 2014), U.S. Provisional Patent Application 62/059,275 titled "LOW-COMPLEXITY VOICE ACTIVITY DETECTION" (filed on Oct. 3, 2014), and U.S. Provisional Patent Application 62/147,503 titled "LOW-COMPLEXITY VOICE ACTIVITY DETECTION" (filed on Apr. 14, 2015). All of the above-mentioned patent applications are incorporated herein by reference in their entirety.

TECHNICAL FIELD OF THE DISCLOSURE

The present invention relates to the field of audio signal processing, in particular, to voice activity detection for trigging a process in a processing system.

BACKGROUND

In the past, audio signal processing has been applied to improve audio recordings, audio compression, audio transmission, and audio delivery systems. Audio signal processing has evolved over the years as electronics have gotten increasingly more powerful. Modern audio signal processing can involve intelligently deriving information from audio streams and processing audio streams interesting ways. For instance, modern audio signal processing has evolved to include specialized fields related to speech processing—the field of deriving speech information from audio streams. Speech processing can have sub-fields as well, related to areas of research such as: language identification, voice command processing, speaker diarization, speech recognition, speech transcription, speaker identification, speaker verification, and source separation.

Besides modern audio signal processing, modern audio systems have also become more complex and ubiquitous as microphones and speakers become cheaper and more pervasive. Audio signal processing enables computerized analysis of voice and video calls, e.g., making it possible for voice commands to be made on the phone without the need for a human call operator. Audio signal processing also enables users to speak directly to their electronic devices seamlessly without the use of haptic user interface. Furthermore, audio signal processing can enable more intelligent conference calls by deriving contextual information and language information from various audio streams.

OVERVIEW

Many processes for audio signal processing can benefit from voice activity detection, which aims to detect the presence of speech as opposed to silence or noise. The present disclosure describes, among other things, leveraging energy-based features of voice and insights on first and second formant frequencies of vowels to provide a low-complexity and low-power voice activity detector. A pair of two channels is provided whereby each channel is configured to detect voice activity in respective frequency bands of interest. Simultaneous activity detected in both channels can be a sufficient condition for determining that voice is present. More channels or pairs of channels can be used to detect different types of voices to improve detection and/or to detect voices present in different audio streams.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which:

FIG. 25 shows an exemplary register file map for a voice activity detector, according to some embodiments of the disclosure;

FIG. 26 shows an exemplary structure for instructions executable by the voice activity detector having a variety of possible opcodes;

DESCRIPTION OF EXAMPLE EMBODIMENTS OF THE DISCLOSURE

Basics of Voice Activity Detection (VAD)

Voice activity detection (VAD) (also known as speech activity detection or speech detection) involves determining whether one or more voices is present or not present in an audio stream. In many cases, an audio stream can be noisy, which can make it difficult for a system to detect voices. Noise can come from sources not associated with speech, e.g., low-frequency sounds from a fan, a refrigerator, a helicopter, a motor, a loud bang, sounds from a keyboard, etc. Besides issues from noise, voices in an audio stream can be imperfect simply due to the way the audio was captured and/or transmitted. For at least these reasons, some VAD algorithms can be quite complicated, especially if the VAD algorithm is expected to perform with high accuracy.

Generally speaking, a VAD algorithm has two parts: a feature extraction part and a decision making part. To achieve accurate results, both of these parts can be computationally expensive. For instance, the feature extraction part can involve extracting a large number of complex features from the audio stream, and the decision making part can involve computationally expensive algorithms (e.g., statistical models, artificial intelligence algorithms, etc.). If VAD is being used for a device with limited resources, e.g., a mobile device with limited power and/or computation resources, many of the VAD algorithms are not suitable due to their power hungry implementations. The need for a low-power VAD mechanism is even more pressing when VAD is running constantly in real-time applications. The present disclosure describes a low-power VAD mechanism that can address some of these concerns.

Understanding Speech

Figure 1A:
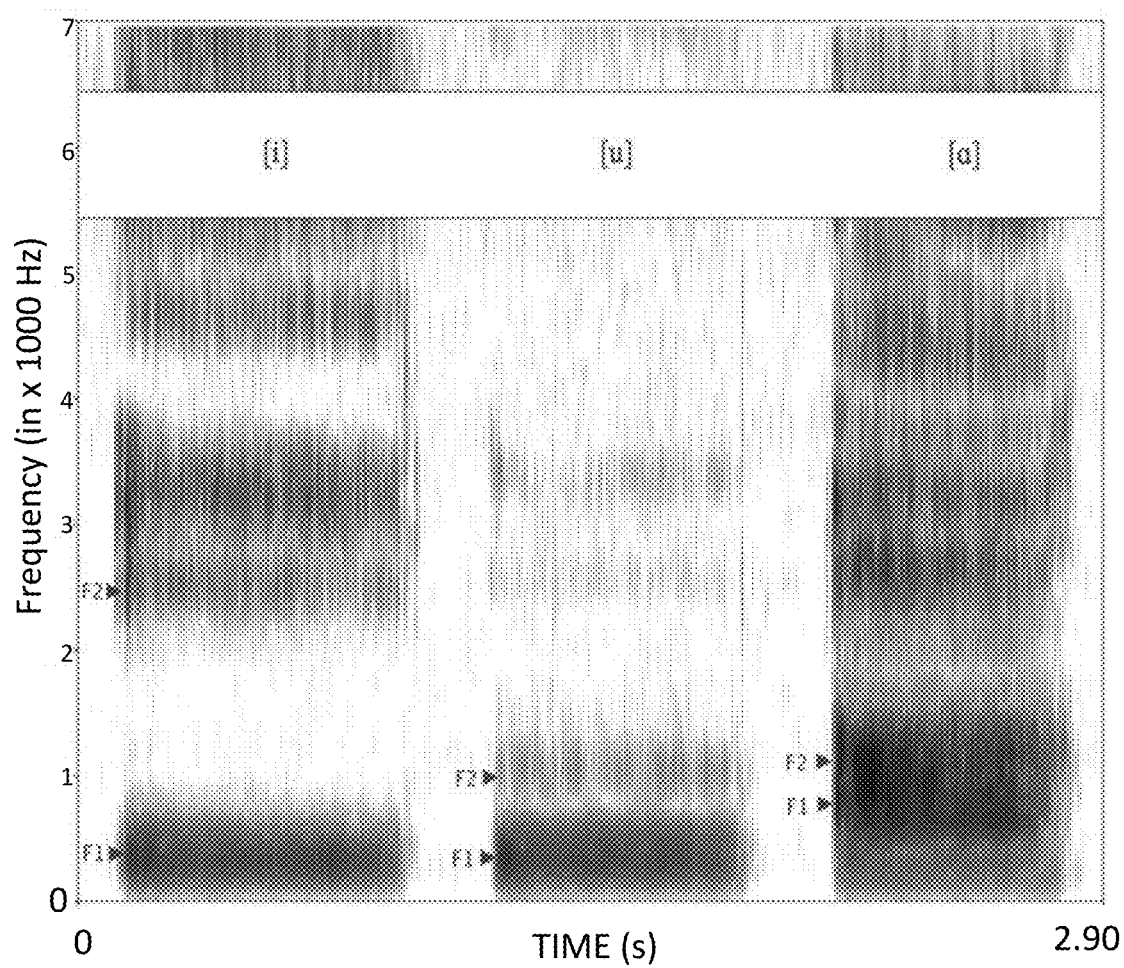
FIG. 1A shows exemplary spectrograms illustrating formants of some vowels, according to some embodiments of the disclosure.

To detect voice activity, one must understand characteristics of voices to design a voice activity detector that can distinguish what is likely to be a voice and what is likely to be noise. It is well known that different sounds in human speech have distinct characteristics in the frequency spectrum. FIG. 1 shows exemplary spectrograms illustrating formants of some vowels, according to some embodiments of the disclosure. Specifically, the left spectrogram shows the characteristic spectral peaks of the American English vowel i, the middle spectrogram shows the characteristic spectral peaks of the American English vowel u, and the right spectrogram shows the characteristic spectral peaks of the American English vowel a. As it can be seen from the spectrograms, each vowel has distinguishable spectral peaks called "formants". Formants are centered near different sets of frequencies for different vowels or types of sounds. The first two formants (having the lowest frequencies) are called F1 and F2 (marked on the spectrogram); more (higher) formants (e.g., F3, F4, F5) can also exist. F1 and F2 are used most often to distinguish spectrograms associated with different vowels.

Taking advantage of distinguishable formant frequencies of voice, many VAD mechanisms process an audio stream to observe activity over a wide frequency range to assess whether the spectral activity resembles voice. For instance, one example VAD mechanism generates information for a wide spectrum of frequencies, e.g., through 64 sub-bands arranged as bands spanning from 0 to 4000 Hz, and detects voice activity using a complex decision making part based on the outputs from the large number of sub-bands by determining whether the characteristic spectral peaks are present. A large number of sub-banks and a complex decision algorithm can often mean that the VAD system is high in complexity, large in size, and power hungry.

Leveraging Insights on Formants to Provide a Voice Activity Detector

To significantly reduce the complexity and power consumption of a VAD system, a simpler, low-power, but effective voice activity detector can leverage insights on first and second formant frequencies of vowels to detect whether a voice present is in an audio stream. Assuming speech is likely to include vowel sounds, voice activity detection can generate a reasonable detection result if some vowel sound is detected in an audio stream, since other sources of sound typically do not produce vowel sounds or have characteristic formants associated with vowels. By leveraging insights on characteristic formant frequencies of a number of vowels, a voice activity detector can examine only a part of the spectrum and still capture sufficient information to make a reasonable decision whether a voice is present or not. Instead of using a large number of filter sub-banks to look at a wide range of frequencies, it is possible to use a far smaller number of filters focused on certain frequency bands of interest capable of detecting a reasonable number of vowels.

In one example, a filter pair having two channels can be tuned to detect activity in a close set of F1 frequencies and another close set of F2 frequencies. By having two (just wide enough) frequency bands of interest covering respective groups of first and second formant frequencies, the filter pair can detect a good number of vowels if (simultaneous) activity is detected in both frequency bands of interest. For instance, a first frequency band of interest can be a frequency band from 200 Hz to 600 Hz, and a second frequency band of interest can be a frequency band from 1600 Hz to 2500 Hz.

The exact frequency bands of interest and the number of frequency bands used can change depending on the desired application of the voice activity detectors disclosed herein. For instance, a voice activity detector can vary the implementation by changing the frequency band to cover a different set of frequencies encompassing a different group of formant frequencies. In some instances, one can specify a frequency band to cover one or more of the following: some F1 frequencies, some F2 frequencies, some F3 frequencies, some F4 frequencies, some F5 frequencies. In some embodiments, if desired, a plurality of channels detecting activity in a plurality of frequency bands can be used. The frequency bands of interest may or may not overlap, depending on the application.

Given carefully selected first and second frequency bands, it is possible to provide a voice activity detector which generates a detection result in response to the simultaneous detection of activity in the first and second frequency bands and to generate an output with reasonable confidence indicating that a voice is present in an audio stream. It is noted that the particular frequency bands of interest can be selected such that the bands hit a wide range of words while being high enough in frequency to not be impacted by low frequency noise sources like fans, ACs, and motors.

The following table, which associates the International Phonetic Alphabet (IPA) to respective (average) first formant and second formant frequencies, shows which sounds are detectable using an exemplary first frequency band from 200 Hz to 600 Hz and a second exemplary frequency band from 1600 Hz to 2500 Hz. The exemplary first frequency band, as shown in the table below, covers a group of F1 formant frequencies characteristic of some vowels, and the exemplary second frequency band covers a group of F2 formant frequencies characteristic of some vowels. It is noted that the data for the columns "First Formant F1 in Hz" and "Second Formant F2 in Hz" was reproduced from an article by Catford, J C, entitled "A Practical Introduction to Phonetics", Oxford University Press, p. 161 (1988).

first and second frequency bands, some vowels are not easily detectable. Changing the frequency bands (e.g., making the frequency bands wider and/or shifting the frequency bands), and/or using more frequency bands, can allow the system to cover formant frequencies of more sounds. In some cases, the vowels are not easily detectable because the F1 and F2 frequency pair for the particular vowel is too close to reasonably isolate them using a time domain filter bank. However, some special filters can be used, e.g., tuned elliptical filters, to better isolate the content of the audio stream in those frequencies to improve detection capabilities.

Based on the insights on formant frequencies of vowels, a low-complexity and low-power voice activity detector can be used to determine whether a voice is present or not by providing filters that can detect presence of voice activity resulting from a reasonable number of vowels. A voice activity detector can include a first channel for processing a first audio stream and detecting activity in a first frequency band and a second channel for processing the first audio stream and detecting activity in a second frequency band. It is important to note that the first frequency band and the second frequency band are not just any frequency band, but they are selected carefully to allow the voice activity detector to detect the presence of voice, i.e., vowels. Accordingly, the first frequency band includes a first group of formant frequencies characteristic of vowels and the second frequency band includes a second group of formant frequencies characteristic of vowels. Furthermore, the voice activity detector includes a first decision module for observing the first channel and the second channel to determine whether voice activity is present in the first audio stream.

Detecting activity in the first frequency band and/or the second frequency band generally indicates voice activity is present in the first audio stream (due to the inference that vowel sounds are likely to be present). In some cases, observing just the first channel and the second channel for simultaneous activity is enough to infer that voice activity is

| Vowel (IPA) | First Formant F1 in Hz | Second Formant F2 in Hz | Detectable? (using first frequency band of 200-600 Hz with a center frequency at 400 Hz and second frequency band of 1600-2500 Hz with a center frequency at 2050 Hz) |
| --- | --- | --- | --- |
| i | 240 | 2400 | Yes |
| y | 235 | 2100 | Yes |
| e | 390 | 2300 | Yes |
| ø | 370 | 1900 | Yes |
| ɛ | 610 | 1900 | Yes |
| œ | 585 | 1710 | Yes |
| a | 850 | 1610 | Somewhat |
| æ | 820 | 1530 | Somewhat |
| ɑ | 750 | 940 | No |
| ɒ | 700 | 760 | No |
| ʌ | 600 | 1170 | No |
| ɔ | 500 | 700 | No |
| ɤ | 460 | 1310 | Somewhat |
| o | 360 | 640 | No |
| ɯ | 300 | 1390 | Somewhat |
| u | 250 | 595 | No |

It is important to note that the above table illustrates possible detection outcomes if two channels are provided to detect activity in the first frequency band of 200-600 Hz with a center frequency at 400 Hz and the second frequency band of 1600-2500 Hz with a center frequency at 2050 Hz. The detection outcomes naturally would differ if different frequency bands are used. Due to the exemplary setup of the present. In other words, detecting activity in both the first frequency band and the second frequency band is sufficient to determine voice activity is present in the first audio stream. The groups of frequencies can overlap, or in some cases, they may not overlap.

In some embodiments, the voice activity detector can include more channels. For instance, the voice activity detector can include a third channel for processing the first audio stream and detecting activity in a third frequency band, wherein the third frequency band includes a third group of formant frequencies characteristic of vowels. The first decision module can then be configured to observe the third channel (in addition to the first channel and the second channel) to determine whether voice activity is present in the first audio stream. This third group of formant frequencies may not capture some of the formant frequencies covered by the first group and the second group. Accordingly, the additional channel can improve sensitivity of the voice activity detector. The groups of frequencies can overlap, or in some cases, they may not overlap, or in some other cases, only some of the groups overlap each other.

A voice detector having one channel for the first frequency band of 200-600 Hz with a center frequency at 400 Hz and another channel for the second frequency band of 1600-2500 Hz with a center frequency at 2050 Hz serves as an example voice activity detector. While it is preferred that one of the channels has a frequency band which includes 400 Hz in the band, and the other one of the channels has a frequency band which includes 2050 Hz in the band, it is possible to provide different first and second frequency bands which deviates from these exemplary frequency bands and center frequencies.

Selecting Frequency Bands of Interest Based on Certain Factor(s)

Broadly speaking, frequency bands can be tuned to capture certain sets of formant frequencies characteristic of a voice. Naturally, if the formant frequencies vary based on the speaker or some other aspect (i.e., formant frequencies characteristic of a voice can differ from one type of voice to another), the frequency bands can be adjusted based on the speaker or some other aspect. For this reason, the frequency bands of interest of a voice activity detector can be provided or adjusted based on one or more factors. It is also possible that the frequency bands of interests are parameterizable based on the one or more factors such that the voice activity detector can adapt to the different formant frequencies. For instance, user input or some other form of input can be provided to adjust the frequency bands of interest.

In some embodiments, the frequency bands can be provided or adjusted based on differences seen in formant frequencies observed for male versus female caused by differences in pitch. As shown in the table below, there is a slight variance in male and female utterances for some vowel formant frequencies of American English, especially with the F2 formant frequencies.

| Formant | Gender | [A] | [ɛ] | [ɪ] | [▢] | [ʊ] | [I] | [E] | [Θ] |
|---|---|---|---|---|---|---|---|---|---|
| F1 | Male | 730 | 460 | 270 | 590 | 300 | 400 | 550 | 660 |
| F1 | Female | 850 | 560 | 310 | 590 | 370 | 400 | 550 | 860 |
| F2 | Male | 1090 | 1890 | 2290 | 880 | 870 | 1920 | 1770 | 1720 |
| F2 | Female | 1220 | 2320 | 2790 | 880 | 950 | 1920 | 1770 | 2050 |

Figure 1B:
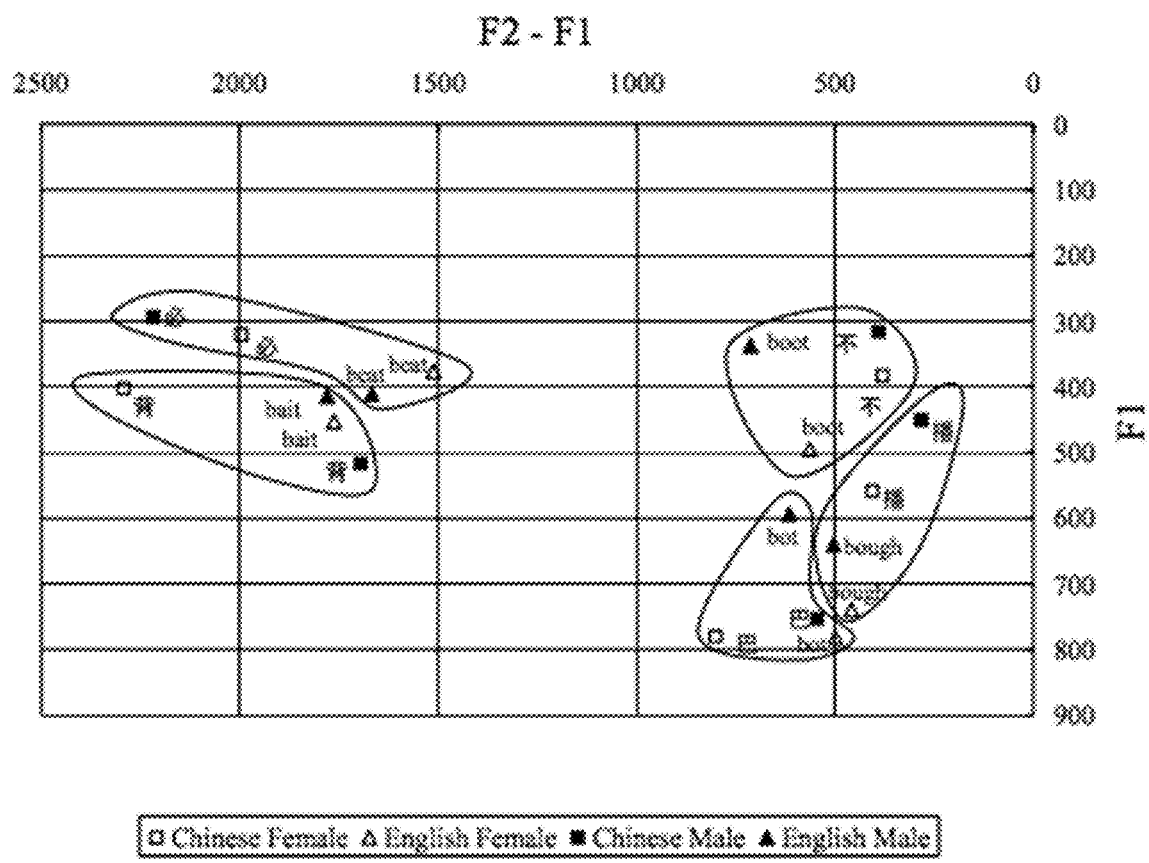
FIG. 1B shows exemplary varied formant frequencies of similar sounds in Chinese and English, according to some embodiments of the disclosure.

In some embodiments, the frequency bands can be provided or adjusted based on differences in formant frequencies present for different languages and/or dialects. For instance, when comparing formant frequencies between similar sounding Chinese and English sounds (i.e., the same vowels), some similar sounding vowels can have variations in formant frequencies and can motivate some tuning in the frequency bands. FIG. 1B shows exemplary varied formant frequencies of similar sounds in Chinese and English, according to some embodiments of the disclosure. The plot is reproduced from an article, entitled "An Acoustic Analysis of Chinese and English Vowels", by Chen et al (retrieved from arabou.edu.kw on Jun. 30, 2014). Formant frequency data points for similar sounding sounds uttered by Chinese speakers and English speakers has a line drawn around them. As it can be seen from the plot showing formant spaces of a few exemplary sounds, frequency bands can be adjusted or tuned on the basis of the language (and for male versus female too) due to the observed slight variations in formant frequencies, despite the sounds being the same (or corresponds to the same phonetic alphabet symbol). In some other instances, frequency bands of interests can also be adjusted on the basis of differences in formant spaces observed for other languages besides Chinese and English.

In some embodiments, the frequency bands can be adjusted based on differences in formant spaces observed for speakers with different native tongues and/or the language/dialect spoken. Accents can also cause variations in formant frequencies and motivate some tuning in the frequency bands.

In some embodiments, the frequency bands can be adjusted based on one or more pre-defined utterance/phrase, so that the frequency band captures formant frequencies of a particular vowel (instead of trying to capture formant frequencies of vowels characteristic of a kind of speaker or all speakers). For instance, various voice activated programs triggers when a user utters or say a particular keyword or phrase, e.g., "Hello, Meera", "Help me, Bobi", "OK, Sami", "Alina" etc. The frequency bands of interest can be tuned to detect a first vowel sound of these phrases (e.g., "Eyy", "El", "Oo", "Aa", etc.) based on the specific formants associated with the first vowel sound. The resulting VAD is thus tailored to a particular application to provide low-power, low-complexity command detection. In some embodiments, a single channel is sufficient for detecting the first vowel sounds of these phrases. In some embodiments, multiple channels having different frequency bands of interest (e.g., tailored to different kinds of speakers uttering the same first vowel sound of interest) can be used to detect the first vowel sounds.

Exemplary Methods Using Voice Activity Detection to Trigger a Process

Many systems can take advantage of the low-power and low-complexity voice activity detector. For instance, a system can use the detection result from the voice activity detector to kick off a process to be performed by a processor of the system. In another instance, a system can use the detection result from the voice activity detector to turn on a part of the system (or use the detection result to keep that part of the system substantially turned off to reduce overall power consumption).

Figure 2:
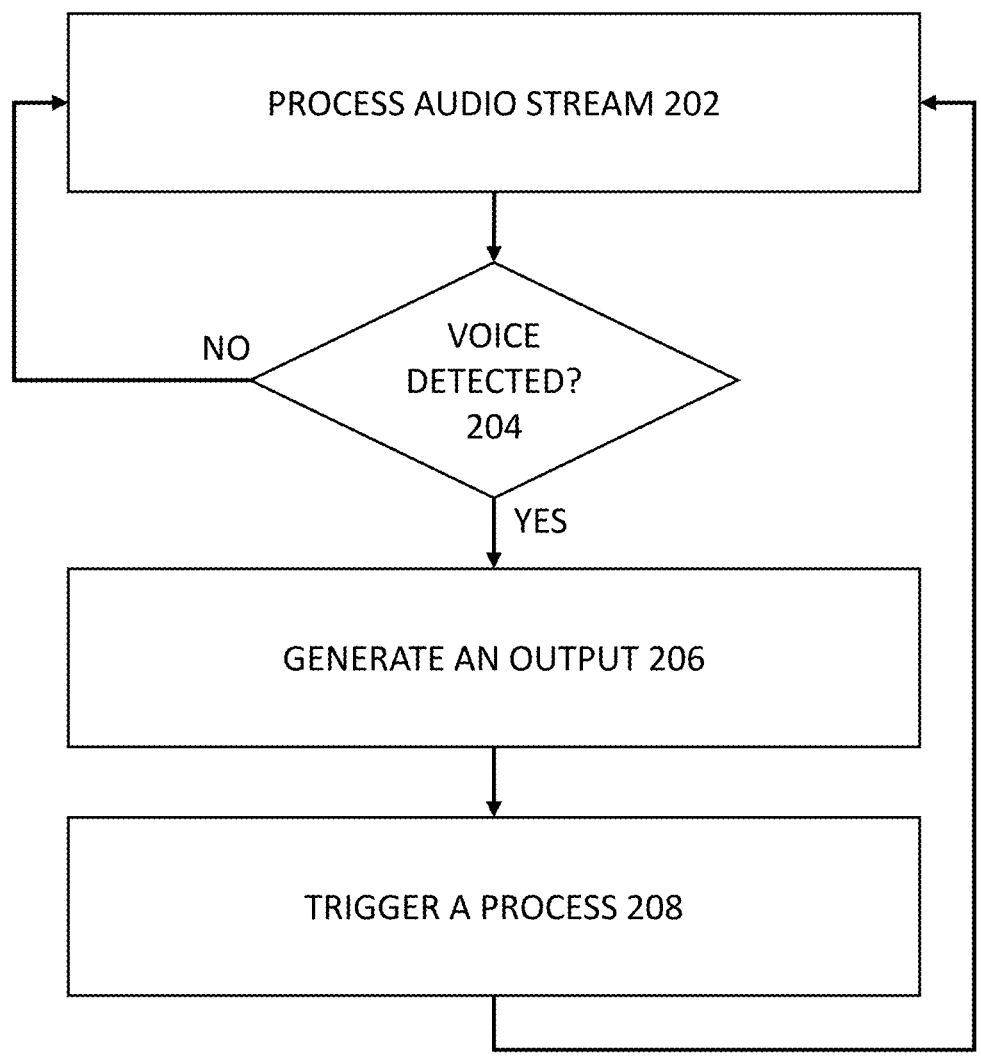
FIG. 2 shows an exemplary method involving voice activity detection, according to some embodiments of the disclosure.

FIG. 2 shows an exemplary method can be performed by a system that takes advantage of the low-power voice activity detector, according to some embodiments of the disclosure. The method for voice activity detection can include processing, in a first channel, a first audio stream and detecting activity in a first frequency band (wherein the first frequency band includes a first group of formant frequencies characteristic of one or more first vowels) and processing, in a second channel, the first audio stream and detecting activity in a second frequency band (wherein the second frequency band includes a second group of formant frequencies characteristic of one or more second vowels) (box 202). The method further includes observing, by a first decision module, the first channel and the second channel to determine whether voice activity is present in the first audio stream (diamond 204). The determination can be performed periodically or as needed by the system. If no voice activity is detected, the method can return to the processing step of box 202 to continue monitoring the first audio stream (in real-time). If voice activity is detected, the method proceeds to box 206.

Generally speaking, detecting activity in the first frequency band and/or the second frequency band indicates voice activity is present in the first audio stream. In some cases, detecting activity in both the first frequency band and the second frequency band is sufficient for determining that voice activity is present in the first audio stream. Phrased differently, detecting activity in both the first frequency band and the second frequency band is sufficient for generating, by the first decision module, an output of the first decision module to indicate that voice activity is present in the first audio stream (box 206). The first decision module can output a first signal in response to determining that voice activity is present in the first audio stream (box 206). In some other cases, detecting activity (which could be performed by the first decision module or some other decision module) in one or more other channels tuned to other group(s) of formant frequencies characteristic of vowels can cause an output to be generated to indicate that voice activity is present (box 206).

A process can be triggered in response to the first signal (box 208). For instance, the first signal can trigger a part of the system to wake up from a low-power or no-power state. In another instance, the first signal can initiate a process to be performed. In some embodiments, the method returns to box 206 to continue monitoring the first audio stream for voice activity.

Although this method is described involving one particular audio stream being processed, it is understood by one skilled in the art that the method or a similar method can be applied to process other audio streams(s) as well. Furthermore, other channels, other decision modules, and/or other voice activity detectors can be provided to implement this method or other functions of voice activity detection disclosed herein as being variants to this method.

Exemplary Apparatuses and Systems Having a Voice Activity Detector

Figure 3:
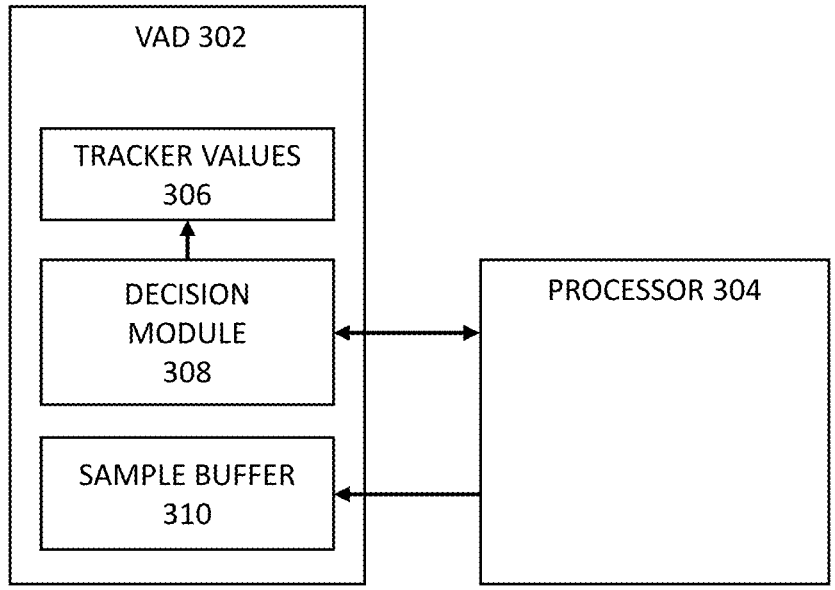
FIG. 3 shows an exemplary system having a voice activity detection apparatus, according to some embodiments of the disclosure.
Figure 4:
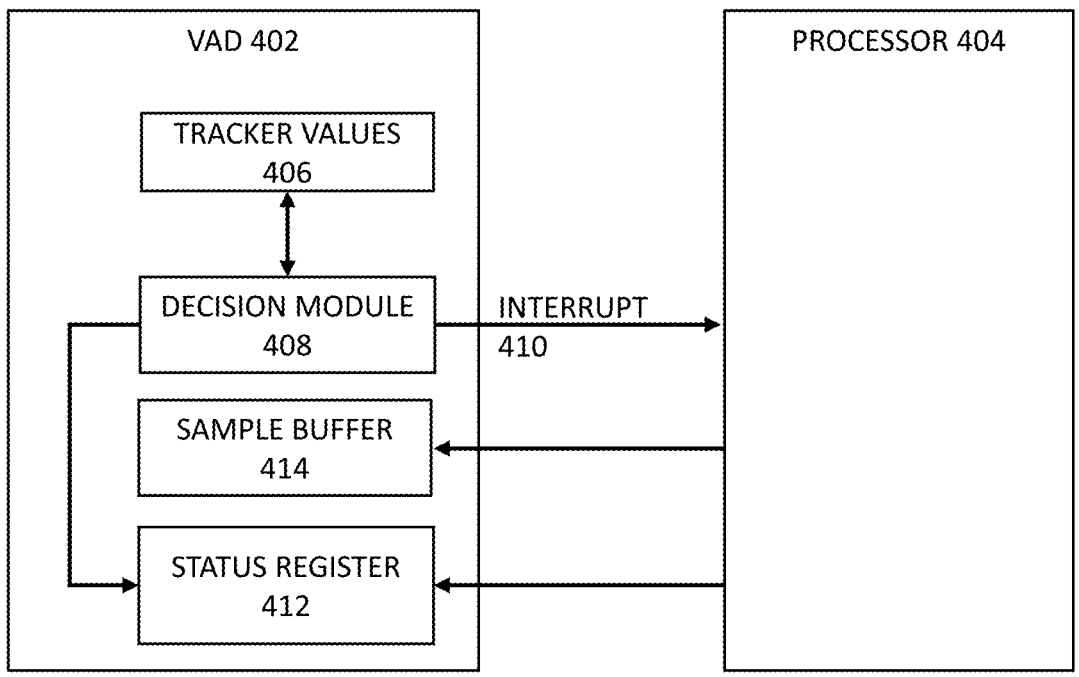
FIG. 4 shows another exemplary system having a voice activity detection apparatus, according to some embodiments of the disclosure.

Different flavors of apparatuses and systems can make use of the voice activity detectors described herein. FIGS. 3 and 4 illustrate different types of systems. For both types of systems, the voice activity detector can include storage elements for maintaining tracker values of the first channel and the second channel. The tracker values of the first channel are associated with activity detected in the first frequency band; the tracker values of the second channel are associated with activity detected in the second frequency band. These tracker values allow the first and second channels records how much activity is in the first and second frequency bands, respectively, and can be updated in real-time as the first and second channels monitor the first audio stream. The storage elements can be registers or memory elements suitable for maintaining tracker values as the first and second channel continues to monitor the first audio stream.

One unique property of voice/speech is that the audio signal associated with a voice is quasi-stationary for 20-30 milliseconds. Thus, it is not necessary for the decision module to continuously monitor the tracker values. In some embodiments, the storage elements having the tracker values are accessed periodically (or aperiodically) by the first decision module to observe the first channel and the second channel (as the first channel and second channel continuously processes the first audio stream). This can avoid having a decision module running continuously (thereby consuming more power), as having the decision module checking the tracker values more frequently than that is not necessary. For example, a general purpose timer can set a period for 20 milliseconds to wake up the decision module to check the tracker values.

FIG. 3 shows an exemplary system having a voice activity detector, according to some embodiments of the disclosure. The system includes a voice activity detector 302 and processor 304. The voice activity detector 302 includes tracker values 306 and a decision module 308. The decision module 308 can output a signal to indicate that voice activity is detected in the first audio stream. In some cases, the signal from the decision module 308 can write a value to a storage element (e.g., register or some other suitable memory element) to indicate that voice activity is detected. The processor 304 is configured to perform a process in response to a signal from the decision module 308 and/or the value of the storage element. In some embodiments, instead of waiting for the signal from the decision module 308, the processor 304 can also query (periodically or aperiodically) the decision module 308 and/or the value of the storage element to determine whether the decision module 308 has determined voice activity has been detected.

In some embodiments, a sample buffer 310 (provided on a suitable storage element) can be provided to maintain the latest sample of the audio stream (e.g., having a size which can range from 20 milliseconds to 500 milliseconds) in case the processor 304 needs to look at a latest sample of the audio stream where voice activity is detected to perform the process. The size of the sample buffer 310 can depend on the type of process being performed by the processor 304. For instance, command detection may require a sample buffer of 500 milliseconds. In some embodiments, the sample buffer can include voice activity information corresponding to the samples in the buffer. For example, the sample buffer can maintain samples and whether the decision module 308 has determined voice activity has been detected for at least some of those samples. This enhanced sample buffer can aid in command detection and automatic speech recognition (ASR) because one of the steps in command detection and ASR aims to determine where voice/speech is present. The information of associating samples to whether voice activity has been detected for at least some of those samples can thus be leveraged by command detection and/or ASR.

FIG. 4 shows another exemplary system having a voice activity detection apparatus, according to some embodiments of the disclosure. The system includes a voice activity detector 402 and processor 404. The voice activity detector 402 includes tracker values 406 and a decision module 408. The decision module 408 can output a signal to indicate that voice activity is detected in the first audio stream. In this example, the first signal can cause an interrupt signal 410 to be generated to alert processor 404 (the first signal can be the interrupt signal 410 itself).

The processor 404 is configured to respond to the interrupt signal 410. For instance, if the processor 404 is in a low-power state or is powered off, the processor 404 can wake up or power up to perform a process in response to the interrupt signal 410. In some cases, the signal from the decision module 408 can write a value to a storage element (e.g., register or some other suitable memory element) to indicate that voice activity is detected. For instance, the signal can write a value to status register 412 to record that voice activity is detected. In this manner, when processor 404 wakes up, the processor 404 can check the status register 412 to learn the reason for the interrupt signal 410.

The processor 404 can then perform a process based on the value of the status register 412.

In some embodiments, a sample buffer 414 (provided on a suitable storage element) can be provided to maintain the latest sample of the audio stream (e.g., having a size which can range from 20 milliseconds to 500 milliseconds) in case the processor 404 needs to look at a latest sample of the audio stream where voice activity is detected to perform the process. The size of the sample buffer 414 can depend on the type of process being performed by the processor 404. For instance, command detection may require a sample buffer of 500 milliseconds. In some instances, the sample buffer may require a large sample buffer if the wake up time of processor 404 is long.

Referring to both exemplary systems shown in FIGS. 3 and 4, the processor 304 and processor 404 can perform a variety of processes in response to voice activity being detected. Processes can relate to processes which are performed in response to voice activity being detected, or processes which can be aided by the information that voice activity has been detected.

One important feature of the low-complexity voice activity detector disclosed herein is its ability to assist other processes. For instance, in beam forming systems and source separation systems, an important challenge for these systems involves providing a stream qualifier, i.e., a component which aims to determine which one or more audio streams has voice activity. In particular, this has become an issue with, e.g., human machine voice interfaces used with robots, where robots have provided with many audio capturing devices generating parallel audio streams. It is often needed by these systems to quickly ascertain which audio stream has voice activity, i.e., which audio stream the robot should process. These systems often aim to isolate multiple streams of human voice, and having a low-complexity front-end qualifier that can help decision making for these types of processes can be highly valuable.

The following lists some further examples of processes that can be triggered in response to a signal from the decision modules:
Perform a more robust voice activity detection algorithm on the first audio stream;
Perform a (computationally intensive) audio processing algorithm on the first audio stream to derive information from the audio stream;
  Speech recognition;
  Command recognition;
  Language recognition; and
  Speaker identification/verification, and so on;
Initiate recording of the audio stream (or a video stream);
Segment the audio stream;
Perform a process related to the presence of a human nearby the system;
  Beam forming; and
  Adjust one or more characteristics of the system, and so on;
Wake up a part of the system;
  Turn on a processor;
  Turn on a device (screen, speaker, microphone, light, camera, sensor, etc.), and so on;
  Turn on or wake up a radio, transmitter, receiver, transceiver, etc., and
  Turn on a power hungry device.
Generate packets for Voice over IP (VOIP) for transmission; and
Isolate multiple streams of human voice, or determine which one of the audio streams has human voice; and
Modify a state of an audio/video conference.

Implementation for the First and Second Channels

Figure 5:
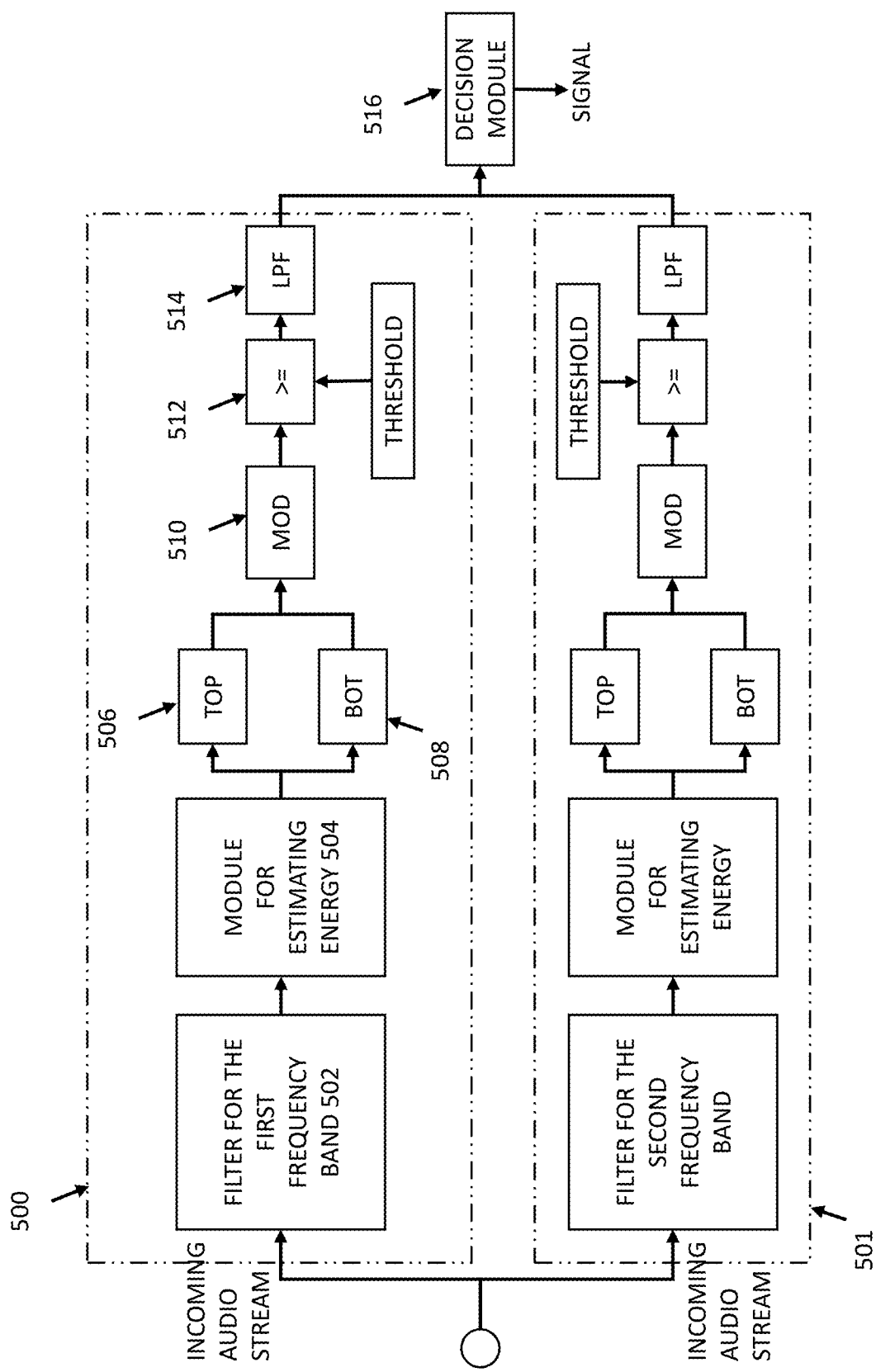
FIG. 5 shows an exemplary voice activity detector having a pair of channels, according to some embodiments of the disclosure.

FIG. 5 shows an exemplary voice activity detector having a pair of channels, according to some embodiments of the disclosure. The top path shows a first channel 500 for processing a first audio stream and detecting activity in a first frequency band (includes a first group of formant frequencies characteristic of one or more first vowels). The bottom path shows a second channel 501 for processing the first audio stream and detecting activity in a second frequency band (wherein the second frequency band includes a second group of formant frequencies characteristic of one or more second vowels). Because each channel can be implemented in a similar fashion, but tuned to a different frequency band, the following passages will describe the implementation of one channel only for simplicity. It is understood by one skilled in the art that the other channel can be implemented in a similar way (i.e., adjusted to detect activity in a second frequency band).

In the first channel, a first filter 502 ("FILTER FOR THE FIRST FREQUENCY BAND") is provided having a first passband corresponding to the first frequency band (a second filter is also provided having a second passband corresponding to the second frequency band in the second channel). Any suitable filter can be used for reducing the bandwidth of the incoming audio stream to just the first frequency band, e.g., the frequency band of interest which covers a reasonable number of vowel F1 formant frequencies. One advantage of using a filter at this stage includes reducing the necessary complexities of the subsequent components in the signal chain since those components can be designed to handle a small bandwidth of the first frequency band.

The first filter 502 can be implemented in different ways to pass frequencies in the frequency band of interest while attenuating frequencies outside of the frequency band of interest. Examples of filters can include one or more of the following: low-pass filters, high pass-filters, band-pass filters, band-stop filters, comb filters, notch filters, etc. While some implementations can aim for a flat response for the frequency band of interest, it is possible for some implementations to have a special response to attenuate or increase the amplitude of certain frequencies within the frequency band of interest. For instance, some sounds which are not associated with voice activity or sounds which can cause a false positive detection result can be filtered out or attenuated using the first filter 502, even if those sounds have frequencies which fall within the frequency band of interest. In some cases, it is desirable for the first filter 502 to have a high attenuation for signals outside of the frequency band of interest.

The first filter 502 filters the incoming audio stream, and the filtered audio stream (i.e., the audio stream in the first frequency band) is then provided to a first module 504 for estimating the energy of the filtered audio stream (i.e., the audio stream in the first frequency band). The first module 504 for estimating energy of the filtered audio stream can be implemented in various ways. One efficient way of implementing the first module is described in relation to FIG. 6.

After the energy of the audio stream in the first frequency band is estimated, a crest detector can be provided to determine whether there is interesting activity in the first frequency band based on the estimated energy of the signal. A crest detector can effectively monitor ambient noise and apply adaptive filtering to track fast changes in estimated energy of the signal to determine whether there is voice activity in the first frequency band. One efficient way of implementing the crest detector is described in relation to FIG. 6.

To provide the crest detector, the first channel can includes a top tracker 506 for tracking the peaks of the estimated energy of the audio stream in the first frequency band to produce an output of the top tracker, a bottom tracker 508 for tracking the quiet periods of the estimated energy of the audio stream in the first frequency band, and a modulation tracker 510 for subtracting the output of the top tracker and the output of the bottom tracker to generate a modulation index. In some cases, the modulation tracker outputs the maximum of either 0 or a difference between the output of the top tracker and the output of the bottom tracker as the modulation index.

The first channel can then detect voice activity using comparator 512 and low pass filtering module 514. The modulation index is compared to a threshold using comparator 512. When the modulation index exceeds the threshold, it is likely that there is some voice activity in the frequency band. In some embodiments, the threshold used for the first channel and the second channel is the same. In some other embodiments, the threshold used for the first channel and the second channel can differ. For instance, if the frequency band of interest for the first channel tends to be noisy when compared to the frequency band of interest for the second channel, detection can be improved if the threshold is less restrictive (i.e., lower) for the first channel than the threshold for the second channel. The threshold can also be different for other factor(s) which make the signal in the first channel be different from the signal in the second channel.

The output of the threshold comparator 512 can be provided to a low pass filtering module 514 (optional). The low pass filtering module 514 can prevent the first channel from detecting spurious activity. The low pass filtering module 514 can be implemented using a simple counting filter. In some embodiments, the low pass filtering module 514 can be provided to remove any noise caused by the modulator index (i.e., the output of the threshold comparator 512). In some cases, for languages that have words with long pauses between vowels (e.g., languages with lots of consonants), the modulation index can drop and make it look like two words instead of one. For just detecting presence of voice, the low pass filtering module 514 is not required, but for some applications where detecting the proper number of words and when the words are uttered (e.g., command detection and/or automatic speech recognition), the low pass filtering module 514 can better detect those boundaries of words.

The outputs of the two channels are then combined, e.g., using a decision module 516, to ensure we have simultaneous activity in both frequency bands as a qualifier for human speech presence. For instance, the decision module 516 can include an "AND" operator for combining the outputs of the two channels. The decision module 516 is configured to output a signal to indicate that voice activity is detected in the audio stream. In some cases, the decision module 516 can be provide a counting filter (absorbing the low pass filtering module 514). In some other cases, the decision module 516 can implement a probabilistic function (or some other artificial intelligence function) which can operate on the outputs from one or more modules including the top tracker 506, the bottom tracker 508, the modulation tracker 510, the comparator 512, and the low pass filtering module 514 to determine whether voice activity is detected.

Exemplary implementations of a channel is explained in greater detail in later sections.

Exemplary Implementation of the Energy Estimating Module

Figure 6:
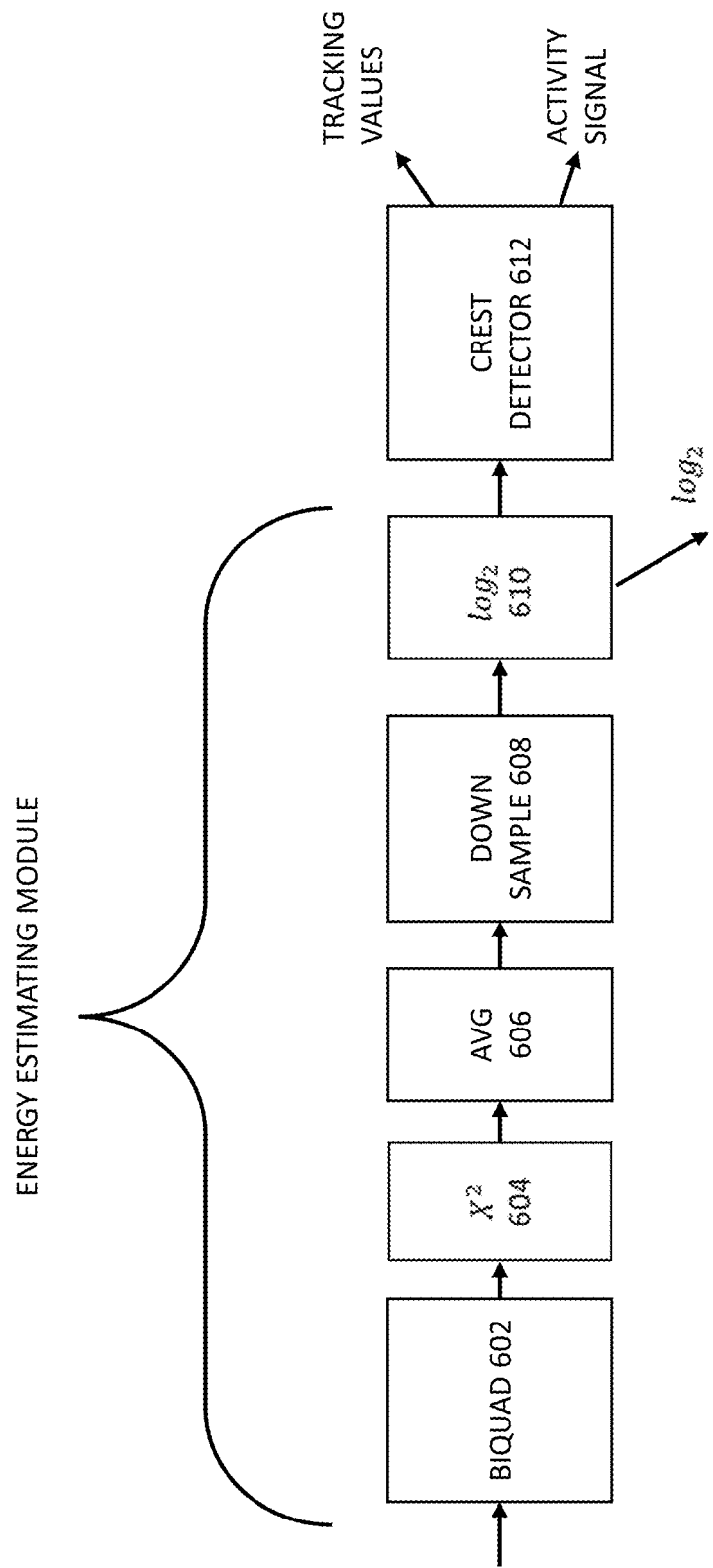
FIG. 6 shows an exemplary signal flow for estimating the energy of an audio stream and analyzing the estimated energy, according to some embodiments of the disclosure.

FIG. 6 shows an exemplary signal flow for estimating the energy of an audio stream and analyzing the estimated energy, according to some embodiments of the disclosure. Because each channel can be implemented in a similar fashion, but tuned to a different frequency band (i.e., using a different filter), the following passages describe the implementation of the energy estimating module and the crest detector for one channel only for simplicity. It is understood by one skilled in the art that the other channel can replicate the energy estimating module and crest detector.

The function of the energy estimating module is to output estimated short term root mean squared (RMS) values of the signal. The RMS values indicative of energy in the audio stream for the frequency band of interest can be used to detect whether there is voice activity. Because human hearing works in log scale, a logarithmic implementation for estimating RMS values is used for generating a detection result for voice detection. Furthermore, the logarithmic implementation is provided in such a way that is easily implementable in hardware for fast and low-power operation. The exemplary logarithmic function implemented by the energy estimating module to generate estimated RMS values (Log MS) follows this equation:

$$\text{Log MS} = \log_2(\text{avg}(x^2))$$

The audio stream of the frequency band can be filtered with a biquad filter 602 to select the areas where the energy estimating module would measure the energy. In some cases, the biquad filter 602 or some other suitable filter can serve as the filter having a pass band corresponding to the frequency band of interest. After the filtering the signal, the output of the biquad filter 602 is passed through the $X^2$ module 604, the average module 606, the down sampling module 608, and the $\log_2$ module 610 to calculate the estimated energy. It is noted that the $\log_2$ value of the energy is calculated in the rate defined by the down sampling module 610. The following shows an exemplary fixed point implementation for the modules shown in FIG. 6.

| | |
|---|---|
| Biquad module 602 | Input: <16.0> signed integer |
| | Output: <16.0> signed integer |
| | Accumulator: <16.0> signed integer; no extra bits are added |
| (Squaring) $X^2$ module 604 | Input: <16.0> signed integer |
| | Output: <30.0> unsigned integer |
| Average module 606 | Math: |
| | AVG(n) = AVG(n − 1) − AVG(n − 1) >> avg_const + X2 >> avg_const |
| | Input: <30.0> unsigned integer |
| | AVG Delay: <46.0> unsigned integer |
| | Output: <30.0> unsigned integer (truncate) |

| | |
|---|---|
| (Normalize) log$_2$ module 610 | Input: <30.0> unsigned integer<br>Output: <5.11> unsigned integer in log2 domain<br>The first step in the log2 is to normalize the signal and get the exponent. The exponent is the amount of shift left the module can perform before most significant bit (MSB) is 1. The mantissa is calculated based on the normalized signal without any enhancement function. The output from the log$_2$ module is 16 bits where the first 5 bits are the exponent and the last 11 bits are the mantissa. The accuracy of the log$_2$ can be roughly 0.7 dB, but the number can be enhanced to 0.03 dB using the math: "$(x - 1/2)^2 - 1/4$" to the mantissa. |

Exemplary Implementation of the Crest Detector

The log$_2$ value can be read directly by a processor, but more math is done to the signal in the crest detector 612 of FIG. 6 (which can include the top tracker, the bottom tracker, and a modulation tracker). The crest detector 612 tracks the variation of in the estimated energy of the signal in the frequency band of interest. As discussed previously, the crest detector has a top tracker which tracks the peaks of the signal and a bottom tracker which tracks the quiet periods of the signal. The difference between these two is the modulation index of the signal. If the incoming signal is a short time constant signal like white noise or a fan will the energy of the signal not vary much and the top and bottom tracker values will be very close. If the signal if speech will the energy vary much more because that speech is short bursts of energy with pauses in between. In that case, the tracker values be much different.

Implementing the crest detector 612 is not trivial. The crest detector 612 can be implemented in such a way that leverages insights of voice/speech. One implementation for the crest detector 612 leverages knowledge about the quasi-stationary property of voice/speech with a short time constant of 20-30 milliseconds. Instead of simply tracking the estimated energy values, the top tracker and the bottom tracker outputs values which adapts to past behavior of the outputs of the top tracker and the bottom tracker. This properties makes the modulation tracker very effective, because the "stickiness" or "adaptiveness" of the top and bottom trackers keeps a fairly high "threshold" in the presence of voice/speech. Sounds with slower modulation than speech will cause a pulsing modulation index instead of a flat modulation index during the modulated envelope (the flat modulation index is expected from voice/speech). Note that a low pass filtering module can be provided to aid in reducing the chance of sounds with slower modulation than speech from causing a false-positive detection result.

When log$_2$ values (estimated energy values) is less than a current maximum value, the top tracker can slowly degrade our current maximum value for "a while" (e.g., 20-30 milliseconds) after which the tracker performs a fast degrade. This allows the modulation index be "charged" but also "discharge" quickly when the tracker is observing values outside a speech envelope. The bottom tracker operates in the inverse/opposite direction. Specifically, the comparison of the current minimum value against the log$_2$ value is reversed (when log 2 values (estimated energy values) is greater than a current minimum value), and the discharging of the bottom tracker would increase the bottom tracker value. When a fast change in the energy of the signal happens, the modulation index will go up until the bottom tracker catches up. The behavior of the top and bottom tracker and the effect of that behavior on the modulation index is what causes a positive detection to happen.

Generally speaking, a channel for detecting activity for a frequency band of interest would provide a top tracker for tracking the peaks of the estimated energy of the audio stream in the first frequency band to produce an output of the top tracker, a bottom tracker for tracking the quiet periods of the estimated energy of the audio stream in the first frequency band to produce an output of the bottom tracker; and a modulation tracker for subtracting the output of the top tracker and the output of the bottom tracker to generate a modulation index.

Furthermore, to leverage the quasi-stationary property of voice, the top tracker and the bottom tracker behave in a sticky way to quickly discharge the top tracker and the bottom tracker outside of a speech envelope. In particular, the top tracker is configured to decrease the output of the top tracker at a first rate if the estimated energy is no longer at a peak (slow degrade), and decrease the output of the top tracker at a second rate faster than the first rate if the estimated energy has not returned to a peak for a particular period of time (fast degrade). Moreover, the bottom tracker is configured to increase the output of the bottom tracker at a first rate if the estimated energy is at a quiet period, and increase the output of the bottom tracker at a second rate faster than the first rate if the estimated energy continued to be in quiet period for a particular period of time.

The following pseudocode for the top tracker, bottom tracker, and the modulation tracker illustrates an example implementation where the top and bottom trackers are sticky and the stickiness affects the modulation index. The pseudocode shows a mechanism for degrading the output of the top and bottom trackers, as well as a mechanism for preventing abrupt discontinuities in the output caused by sudden changes in the estimated energy.

```
// Release accelerator top
    if (mi_top <= log2)
        count_top = 0;
    if (count_top == count) // Accelerate top
        rel_top = count_down_top << accel;
    else
    {
        rel_top = count_down_top;
        count_top ++;
    }
// Release accelerator bottom
    if (min_track >= log2)
        count_bot = 0;
    if (count_bot == count) // Accelerate bot
        rel_bot = count_up_bot << accel;
    else
    {
        rel_bot = count_up_bot;
        count_bot ++;
    }
    // mi_top is the output of the top tracker = top tracker value
    mi_top     = min (mi_top + count_up_top, max ( mi_top - rel_top, log2));
```

```
min_track  = min (log2, min_track + rel_bot );
// mi_bot is the output of the bot tracker = bottom tracker value
mi_bot     = max (mi_bot - mi_count_down_bot, min_track);
// mi_out is the modulation index
mi_out     = max (0.0, mi_top - mi_bot);
```

The crest detector 612 can output tracker values associated with activity in the frequency band of interest. Tracker values such as the $\log_2$ values, values from the top tracker, values from the bottom tracker value, modulation index from the modulation tracker can be stored in a data buffer to maintain a history of the latest calculations.

If the modulation index computed by the crest detector is above a threshold, the crest detector 612 can output a signal which updates an activity value associated with the frequency band of interest stored in a storage element such as a register. A current value determined by the crest detector 612 can be placed as the least significant bit in the storage element were the remaining bits are shifted left by one position each time a signal is received updating the value. This makes is possible for a processor to read this register to get a history of whether voice was detected in past calculations for that frequency band of interest.

The following is another exemplary implementation of the tracker:

```
Exemplary implementation of tracker algorithm on an input array x top_tracker = zeros(1,length(x));
top_tracker(1) = x(1);
bot_tracker = zeros(1,length(x));
bot_tracker(1) = x(1);
top_noaccel_max = bitshift(1,top_noaccel_cycles);
bot_noaccel_max = bitshift(1,bot_noaccel_cycles);
top_noaccel_count = 0;
bot_noaccel_count = 0;
accellerate_top = false;
accellerate_bot = false;
for m = 2:length(x)
    % Tracker algorithm
        % TOP
        if top_tracker(m-1) < x(m)
            top_noaccel_count = 0;
            accellerate_top = false;
            top_delta = top_rise_rate;
            top_tracker(m) = top_tracker(m-1)+top_delta;
        else
            if not(accellerate_top);
                top_noaccel_count = top_noaccel_count + 1;
                if top_noaccel_count > top_noaccel_max
                    accellerate_top = true;
                end
                top_delta = -1 * top_fall_rate;
            else
                top_delta = -1 * top_fall_rate * bitshift(1,
                    accel_factor);
            end
            top_tracker(m) = top_tracker(m-1) + top_delta;
        end
        % BOTTOM
        if bot_tracker(m-1) < x(m)
            % rising
            if not(accellerate_bot);
                bot_noaccel_count = bot_noaccel_count + 1;
                if bot_noaccel_count > bot_noaccel_max
                    accellerate_bot = true;
                end
                bot_delta = bot_rise_rate;
            else
                bot_delta = bot_rise_rate * bitshift(1,
                    accel_factor);
            end
```

```
Exemplary implementation of tracker algorithm on an input array x bot_tracker(m) = bot_tracker(m-1)+bot_delta;
        else
            % falling
            bot_noaccel_count = 0;
            accellerate_bot = false;
            bot_delta = -1 * bot_fall_rate;
            bot_tracker(m) = bot_tracker(m-1)+bot_delta;
        end
    end
end
```

Figure 14:
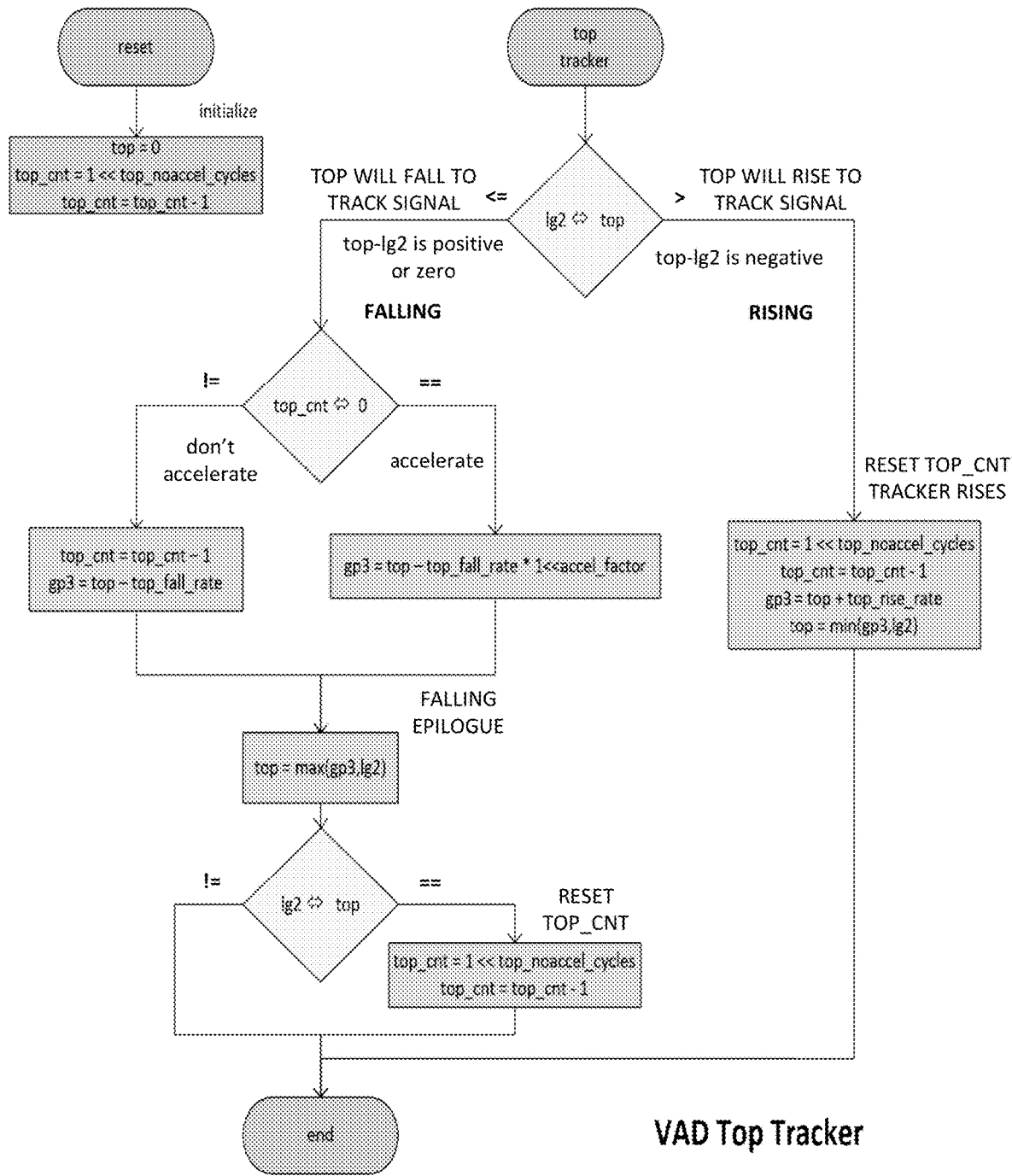
FIG. 14 is a flow diagram illustrating a top tracker, according to some embodiments of the disclosure.
Figure 15:
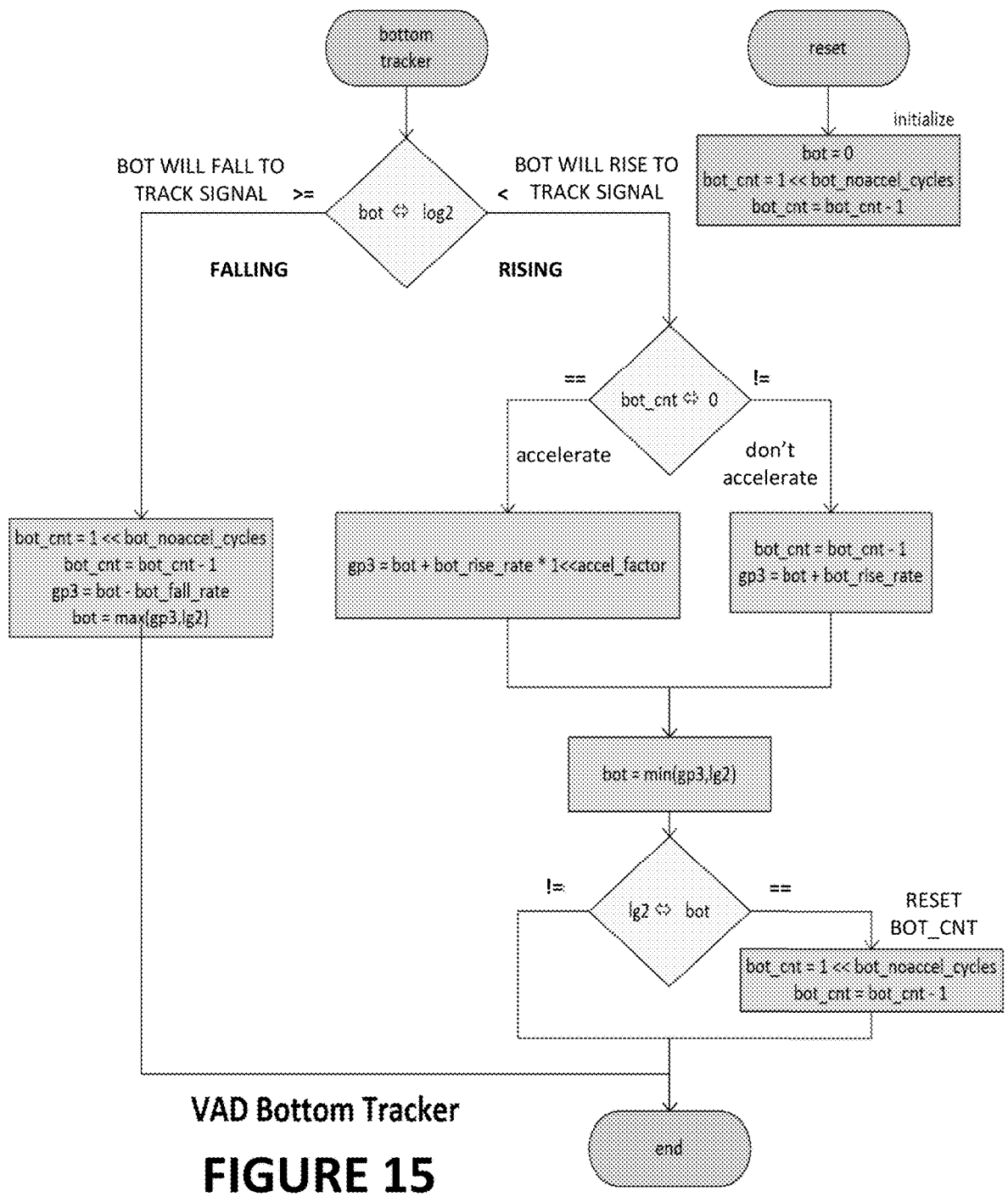
FIG. 15 is a flow diagram illustrating a bottom tracker, according to some embodiments of the disclosure.

A graphical representation of an exemplary implementation of the top and bottom trackers is shown in FIGS. 14 and 15. The flow diagrams illustrate the updating of the top and bottom tracker values. The tracker provides a mechanism to allow the top and bottom trackers to track the signal at appropriate rise and fall rates and acceleration factors to provide the tracking behavior described above.

Using More Channels for the Same Audio Stream to Increase Sensitivity

Generally speaking, a voice activity detection apparatus (or system) for triggering a process in response to detection of voice activity includes a first voice activity detector. The first voice activity detector includes a first channel for processing a first audio stream and detecting activity in a first frequency band (including a first group of formant frequencies characteristic of one or more first vowels) and a second channel for processing the first audio stream and detecting activity in a second frequency band (including a second group of formant frequencies characteristic of one or more second vowels). The first voice activity detector also includes a first decision module for observing the first channel and the second channel and generating an output of the first decision module to indicate whether voice activity is present in the first audio stream. The process is triggered in response to the output of the first decision module.

Detecting activity in the first frequency band and/or the second frequency band typically indicates voice activity is present in the first audio stream. In some cases, detecting activity in both the first frequency band and the second frequency band can be sufficient for generating an output by the first decision module that voice activity is present in the first audio stream. In some embodiments, the first voice activity detector further comprises a third channel for processing the first audio stream and detecting activity in a third frequency band, wherein the third frequency band includes a third group of formant frequencies characteristic of vowels. The first decision module is configured to observe the third channel to determine whether voice activity is present in the first audio stream.

As described above, the voice activity detector circuit works by selecting the first frequency band and the second frequency band to capture a reasonable number of sounds (i.e., one or more first vowels and one or more second vowels) associated with voice to detect voice activity. Different types of people may have different pitches and thus the characteristic formant frequencies can differ. Pitches and/or the characteristic formant frequencies can differ for different types of people based on age, sex, accent, language spoken, race, etc. While the first frequency band and the second frequency band can be tuned to detect voice activity from many different types of people, it is possible to provide more channels, e.g., one or more separate voice activity detectors, to process the same incoming audio stream to improve the overall voice activity detection apparatus. Each voice activity detector (i.e., each pair of channels) can be tuned to detect voice activity for different types of people to increase the sensitivity of the voice activity detection system.

To increase sensitivity to different types of voices, the voice activity detector apparatus can include a second voice activity detector (beyond just having the first voice activity detector described in relation to FIGS. 3-6). The second voice activity detector can include a third channel for processing the first audio stream and detecting activity in an third frequency band, wherein the third frequency band includes a third group of formant frequencies characteristic of vowels, and a fourth channel for processing the first audio stream and detecting activity in an fourth frequency band, wherein the fourth frequency band includes a fourth group of formant frequencies characteristic of vowels. The second voice activity detector can also include a second decision module for observing the third channel and the fourth channel and generating an output of the second decision module to indicate whether voice activity is present in the first audio stream. Similar to the first voice activity detector, detecting activity in both the third frequency band and the fourth frequency band can be sufficient for generating an output signal by the second decision module to indicate that voice activity is present in the first audio stream.

In a variant, the second voice activity detector leverages one or more channels associated with the first voice activity detector (thereby reducing some complexity of the overall system). Specifically, a second voice activity detector can (simply) include a third channel for processing the first audio stream and detecting activity in an third frequency band, wherein the third frequency band includes a third group of formant frequencies characteristic of vowels, and a second decision module for observing (1) one or more of the first channel and the second channel, and (2) the third channel and generating an output of the second decision module to indicate whether voice activity is present in the first audio stream. The process can be triggered in response to the output of the second decision module. Detecting activity in two or more of the first frequency band, the second frequency band, and the third frequency band indicates voice activity is present in the first audio stream. In some cases, detecting activity in two or more of the first frequency band, the second frequency band, and the third frequency band is sufficient for generating the output by the second decision module that voice activity is present in the first audio stream.

A process can be triggered in response to the output of the second decision module. In some cases, the process can depend on the output of the first decision module and/or the output of the second decision module.

The first group of formant frequencies and the second group of formant frequencies can be characteristic of a first type of voice, and the third group of formant frequencies and the fourth group of formant frequencies can be characteristic of a second type of voice different from the first type of voice.

In some variants, further decision modules can be provided which observe some of the channels of the overall system to generate an output to indicate whether voice activity is present in an audio stream. For instance, a system can include a first channel tuned to a first frequency band, a second channel tuned to a second frequency band, a third channel tuned to a third frequency band, a fourth channel tuned to a frequency band, etc. Independent decision modules can observe a subset of these channels, and if simultaneously activity is detected in the particular subset, the decision module can generate an output to indicate whether voice activity is present in the audio stream. It is noted that the frequency bands are carefully selected to cover certain group of formant frequencies, not just any frequency band. In some cases, these bands can correspond to different types of voices, or different groups of formant frequencies characteristic of different types of voices. Some of the frequency bands can, in some cases, overlap each other.

Figure 7:
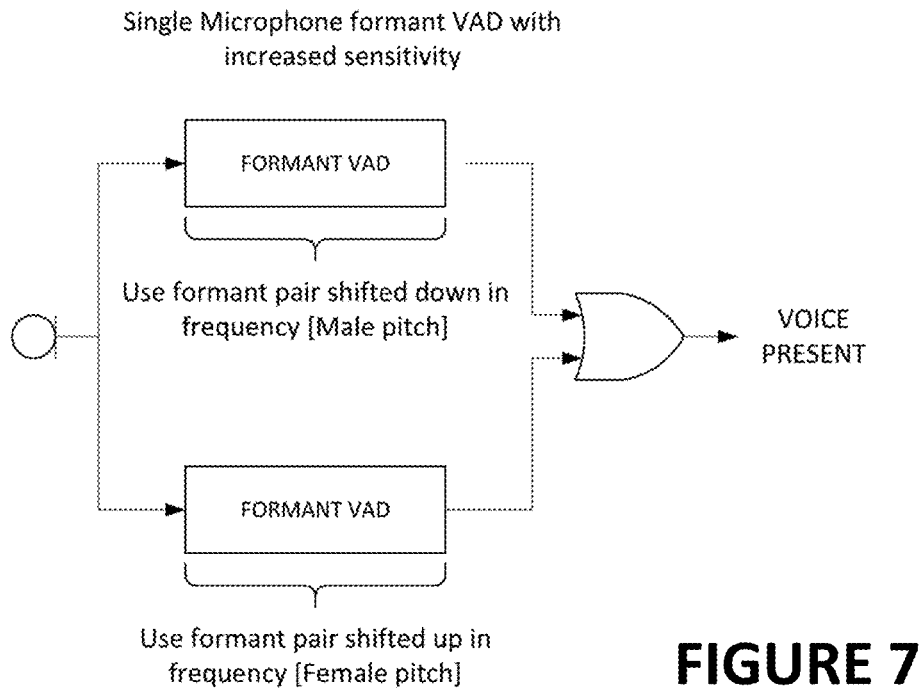
FIG. 7 shows an exemplary voice activity detection apparatus, according to some embodiments of the disclosure.
Figure 8:
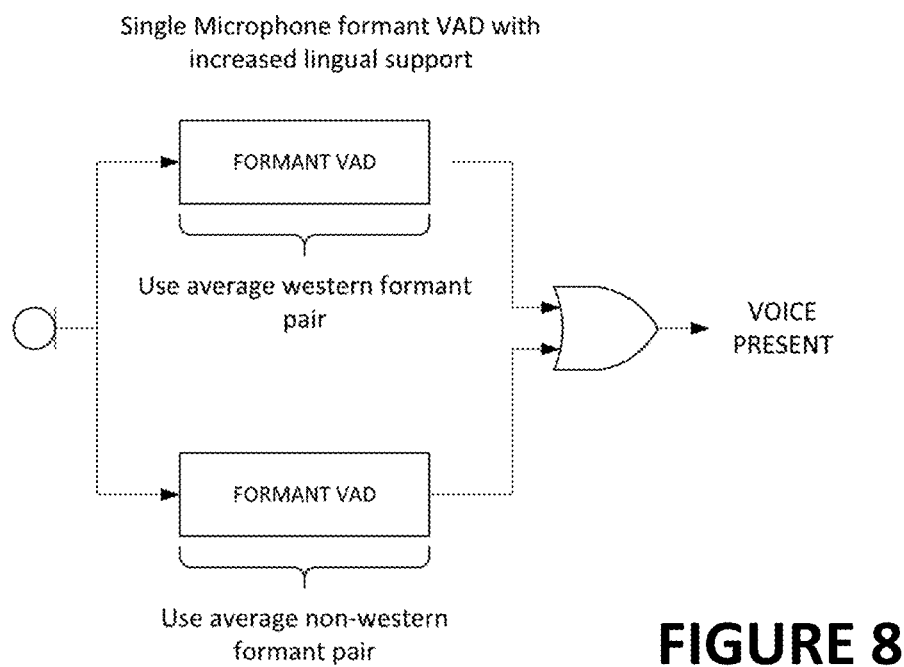
FIG. 8 shows another exemplary voice activity detection apparatus, according to some embodiments of the disclosure.

In one example, the system can include a first channel tuned to a first group of formant frequencies and a second channel tuned to a second group of formant frequencies. The first group of formant frequencies and the second group of formant frequencies can be characteristic of one type of voice, such as a close set of F1 formant frequencies and a close set of F2 formant frequencies, respectively. The system can also include a third channel tuned to a third group of formant frequencies and a fourth channel tuned to a fourth group of formant frequencies. The third group of formant frequencies and the fourth group of formant frequencies can be characteristic of another type of voice, such as a different close set of F1 formant frequencies and a different close set of F2 formant frequencies, respectively. A number of possible decision modules can be provided. A first decision module can observe the first channel and the second channel. A second decision module can observe the third channel and the fourth channel. A third decision module can observe the first channel and the fourth channel. A fourth decision module can observe the second channel and the third channel. Other possible decision modules can monitor a subset of the channels. In some cases, more channels tuned to different groups of formant frequencies can be provided FIG. 7 shows an exemplary voice activity detection apparatus, according to some embodiments of the disclosure. An example shown above is using the extra channel pair to either increase the sensitivity of the voice activity detection apparatus such that the overall system can are large range of vocal pitches (e.g., male pitch and female pitch). FIG. 8 shows another exemplary voice activity detection apparatus, according to some embodiments of the disclosure. In this embodiment, the sensitivity of the voice activity detection apparatus is increased to cover a wider lingual range by using, e.g., western and non-western formant pair detection. The sensitivity for systems shown in FIGS. 7 and 8 are both increased by having an extra voice activity detector having frequency bands tuned to a different type of voice. Many other combinations of frequency bands of interests and corresponding types of voices can be used to increase sensitivity of the voice activity detection apparatus.

Using More Channels for Different Audio Streams to Increase Resilience

Figure 9:
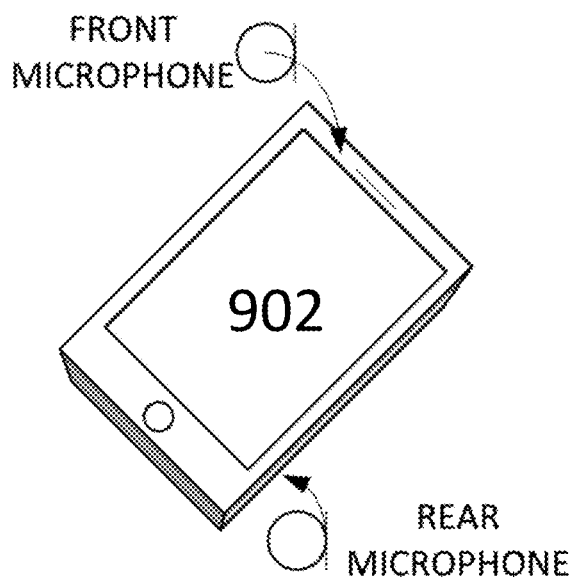
FIG. 9 shows an electronic system having two audio capturing devices, according to some embodiments of the disclosure.
Figure 10:
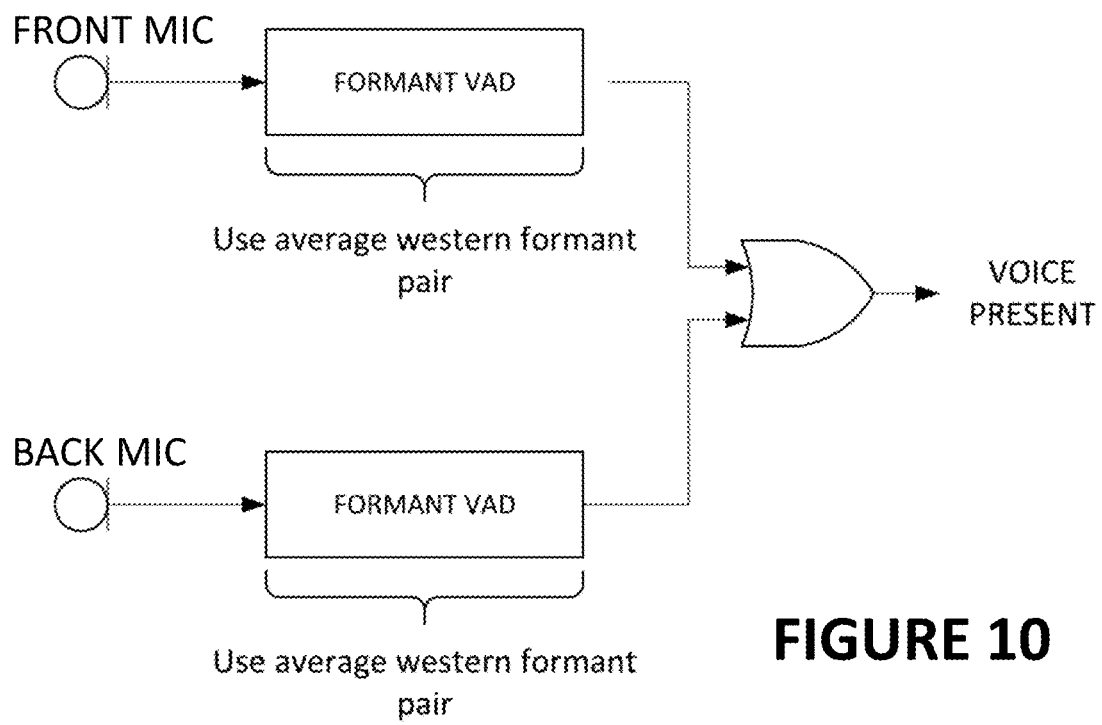
FIG. 10 shows yet another exemplary voice activity detection apparatus, according to some embodiments of the disclosure.

FIG. 9 shows an electronic system having two audio capturing devices, according to some embodiments of the disclosure. By adding another microphone to the system (e.g., a mobile device, or some other types of electronic system) and using two voice activity detectors in parallel, the resilience of the overall voice activity detection apparatus/system can be improved. FIG. 10 shows yet another exemplary voice activity detection apparatus, according to some embodiments of the disclosure. This voice activity detection apparatus is suitable for the electronic system of FIG. 9, or some other electronic system having multiple audio capturing devices (at or near the same location, or distributed remotely from each other). Although this example shows only using two microphones, other numbers of microphones can be used whereby each respective audio stream can be processed by separate voice activity detectors.

A voice activity detection apparatus (or system) being able to processed multiple audio sources can be tremendously helpful, e.g., in systems where it is important to quickly and easily detect which audio stream has human voice activity. It could obviate the need for a "push-to-talk system" (which can be advantageous when users cannot easily press a button to talk). It could improve conferencing systems involving multiple audio streams where it can be advantageous to determine which one or more of the audio streams has voice activity.

The voice activity detection apparatus includes (besides the first voice activity detector, as described previously) a second voice activity detector includes a third channel for processing a second audio stream and detecting activity in the first frequency band (a frequency band used in a channel of associated with the first voice activity detector, which included the first group of formant frequencies characteristic of vowels), a fourth channel for processing the second audio stream and detecting activity in the second frequency band (a frequency band used in a channel of associated with the first voice activity detector, which included the second group of formant frequencies characteristic of vowels), and a second decision module for observing the third channel and the fourth channel and generating an output of the second decision module to indicate whether voice activity is present in the second audio stream.

Detecting activity in both the third frequency band and the fourth frequency band can be sufficient for generating the output to indicate that voice activity is present in the second audio stream. Some other variant of voice activity detector (any one of the variants described herein) can used. A process can be triggered in response to the output of the first decision module and/or output of the second decision module. In some cases, the process being triggered can depend on the output of the first decision module of the first decision module and/or output of the second decision module.

The first audio stream can be generated from a first audio capturing device associated with an electronic system. The second audio stream is generated from a second audio capturing device associated the same electronic system. Typically, the first audio capturing device and the second audio capturing device have different positions/locations/directionality. For instance, the mobile device 902 can have a microphone on two sides of a device. By having another voice activity detector (each voice activity detector processing the audio stream in parallel on respective audio streams generated by the two microphones), the voice activity detector apparatus/system would still function reasonably well no matter the device is face-up or face-down, or covered by a hand, etc.

The example shown in FIG. 10 illustrates that the two voice activity detectors can be tuned to the same type of voice, but they can also be tuned to different types of voice or be adjusted according to some other parameter of the electronic system. The voice activity apparatus would include a second voice activity detector which has a third channel for processing a second audio stream and detecting activity in an third frequency band (wherein the third frequency band includes a third group of formant frequencies characteristic of vowels), a fourth channel for processing the second audio stream and detecting activity in an fourth frequency band, wherein the fourth frequency band includes a fourth group of formant frequencies characteristic of vowels, and a second decision module for observing the third channel and the fourth channel and generating an output of the second decision module to indicate whether voice activity is present in the second audio stream.

In some cases, detecting activity in both the third frequency band and the fourth frequency band is sufficient for outputting the second signal to indicate that voice activity is present in the second audio stream. Some other variant of the voice activity detector (any one of the variant described herein) can used. A process can be triggered in response to the output of the first decision module and/or output of the second decision module. In some cases, the process being triggered can depend on the output of the first decision module of the first decision module and/or output of the second decision module.

The above described arrangements can improve sensitivity for different types of voices and/or other effects from the electronic system or the environment which can cause the formant frequency bands of interests to be adjusted for different audio capturing devices.

The above described arrangements can also be useful for multi-channel audio systems used in voice communication, e.g., shortwave radios that pass a central unit that has to broadcast the incoming audio stream depending on the whether there is voice present. For instance, police radios where instead of pressing a button you want to grab whatever is said by the right person, processing multiple audio streams and detecting voice activity tuned could be a safety feature as an officer that is disabled can still talk to the central/broadcast his voice without having to touch his transmitter.

General Benefits of Combining Results from Multiple Voice Activity Detectors

Usually, the first signal and the second signal from the first decision module and the second decision module, respectively, can be combined to generate a detection result using an "OR" operation. In this manner, either the detection result from the first voice activity detector or the detection result from the second voice activity detector can generate a positive detection result (i.e., voice activity is detected). The added voice activity detector can generate a positive detection result when the other voice activity detector fails to detect voice activity correctly.

Besides added sensitivity, providing more voice activity detectors can generate information that can be used by the process being triggered. In other words, the process to be triggered can depend on the outputs of the voice activity detectors (i.e., the output signals from the detection modules). For instance, if one voice activity detector generated a positive detection result while another voice activity detector did not generate a positive detection result, the process can infer information based on which of the voice activity detector generated the positive detection result. If the voice activity detector tuned for a particular type of voice generated a positive detection result, the processor performing the process can adapt the process to that particular type of voice. If the voice activity detector tuned for a particular type of voice generated a positive detection result, the processor can select a suitable process to perform based on that particular type of voice.

If the added voice activity detectors are processing different audio streams and the position information of the respective audio capturing devices generating the different audio streams is known, information related to the position or direction of the source in relation to the audio capturing devices generating the different audio streams can be inferred. For example, the relative position of a person generating the voice activity in relation to an audio capturing devices can be inferred (e.g., the person is closer to one microphone than the other microphone). The processor performing the process triggered by the output signal(s) of the decision modules can adapt the process based on the information inferred. The processor performing the process triggered by the output signal(s) of the decision modules can in some cases select a suitable process based on the information inferred. The resulting system can be more aware of the environment near these audio capturing devices, and thus provide contextually aware processes in response to the outputs of the voice activity detectors.

Solutions for Lowering Power Consumption: Sampled Analog Technology

In many applications, power consumption in sleep or standby mode of devices can have strict requirements due to demands in energy efficiency (even for devices that has power from the wall). These devices include televisions, gaming consoles, household appliances, etc., which are often plugged in; but for reasons of energy efficiency, their sleep or standby modes cannot consume too much power. When these devices are equipped with voice command detection (e.g., "turn on the TV"), a voice activity detector can advantageously run while the device is in sleep or standby mode so that voice detection can trigger the voice command detection process. Because power consumption requirements are strict, it is desirable for the voice activity detector to operate while consuming small amounts of power.

To achieve low power consumption, the voice activity detector can at least in part be implemented using analog circuitry (i.e., in the analog domain). Analog circuitry which leverages "sampled analog" technology can keep power consumption low for applications where precision is not a limiting factor for the application. "Sampled analog" technology not only allows samples of the audio stream to be stored and processed in analog circuitry, "sampled analog" technology also allows filters and processing to be performed in the analog domain using analog circuitry through charge sharing and/or redistribution. To better understand what analog circuitry achieves, the present disclosure references to "sampled analog" technology described in U.S. Pat. No. 8,188,753 (entitled "ANALOG COMPUTATION"), U.S. Pat. No. 8,547,272 (entitled "CHARGE SHARING ANALOG COMPUTATIONG CIRCUITRY AND APPLICATIONS"), U.S. Pat. No. 8,717,094 (entitled "CHARGE SHARING TIME DOMAIN FILTER"), U.S. Pat. No. 8,736,361 (entitled "HIGH PASS COUPLING CIRCUIT"). All of these referenced patents are incorporated herein by reference.

Figure 11:
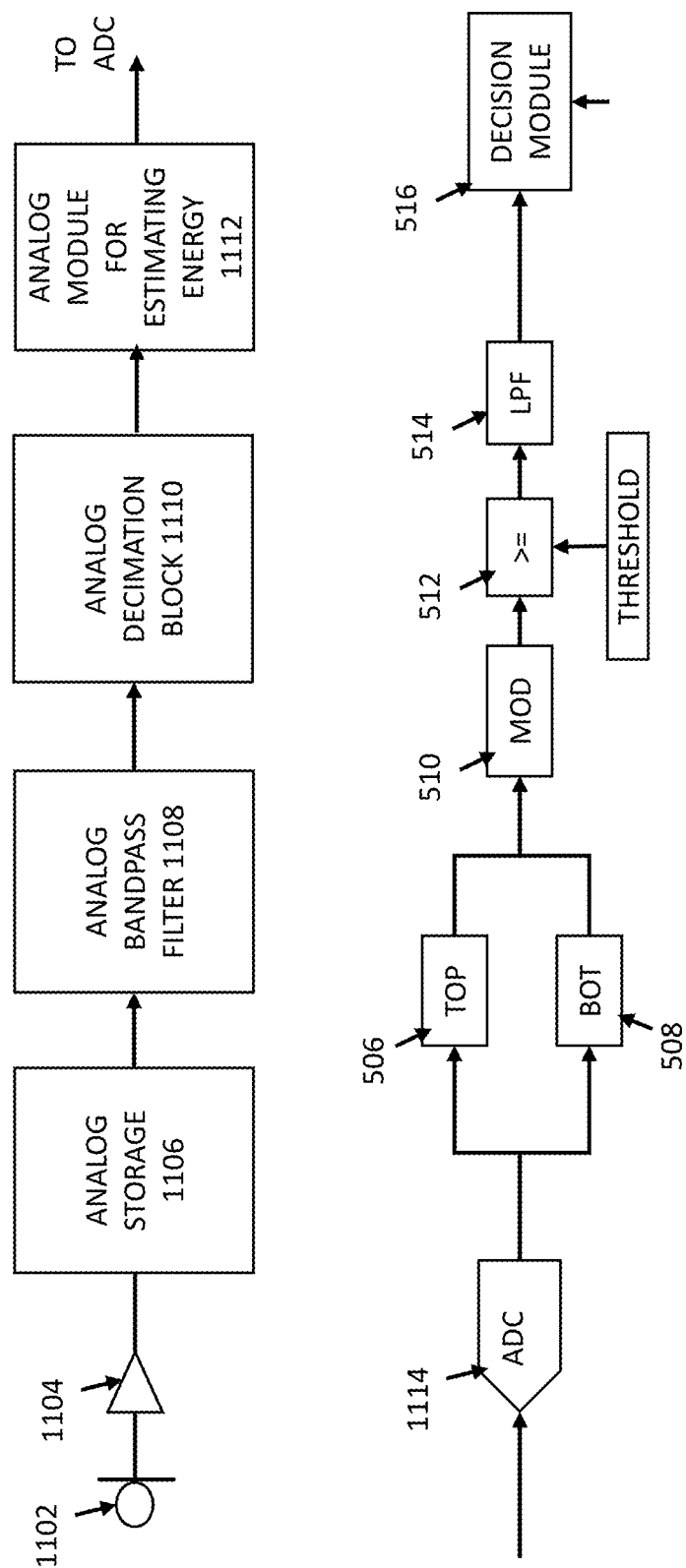
FIG. 11 shows yet another exemplary voice activity detector partially implemented with analog circuitry, according to some embodiments of the disclosure.

FIG. 11 shows yet another exemplary voice activity detector partially implemented with analog circuitry, according to some embodiments of the disclosure. An audio signal generated by the microphone 1102 can be processed by a preamplifier 1104 for amplification. Instead of keeping a digital memory for storing samples of the input audio stream (which can often consume a substantial amount of power), the voice activity detector includes analog storage 1102. Analog storage 1102 would generally include integrated circuits that can store or buffer samples of the audio signal in analog circuitry having charge transfer and charge sharing components. The analog storage 1102 can in some embodiments provide milliseconds of sample storage. The output at the analog storage 1102 can be processed by one or more channels, each channel for detecting activity in a corresponding frequency band. For simplicity, the example illustrates the signal flow for one channel only, but it is understood that more channels can be provided. In one example, a single channel can be provided to detect activity in a frequency band from 100 Hz to 3 kHz to cover a set of human voice formants. Using less channels can also reduce power consumption.

In the example shown, the analog samples of the audio stream is provided from analog storage 1106 to an analog filter, e.g., an analog bandpass filter 1108, to extract signal content in the corresponding frequency band. In some cases, output from the analog filter can be provided to an analog decimation block 1110 to reduce the sampling rate of the (filtered) analog samples of the audio stream. Furthermore, an analog module for estimating energy of the (filtered) analog samples of the audio stream process the analog samples to estimate the energy. It is important to note that analog storage 1106, analog bandpass filter 1108, analog decimation block 1110, and analog module for estimating energy 1112 can all be implemented with analog circuitry in the analog domain. Many of these functions can be implemented easily with charge storage and charge transfer components (i.e., switch coupled capacitor circuits).

The output from the analog module for estimating energy is provided to a analog-to-digital converter (ADC) 1114 to generate a digital signal for digital processing by a set of digital blocks. The digital blocks, the top tracker, bottom tracker, modulation tracker are the same or similar to ones shown in FIG. 5. Note that the decimation performed by analog decimation block 1110 can reduce the sampling rate of the audio stream significantly. This feature can allow the digital blocks, including the ADC 1114, to run at a relatively slow speed and/or can process lower resolution samples to maintain a low power consumption profile. While these are mentioned as digital blocks, it is envisioned that any one of these blocks are implemented using analog circuitry as well.

It can be seen from FIG. 11 that implementation of the front end blocks (i.e., sample storage, bandpass filters, decimation block, modules for estimating energy) in the analog domain not only reduces the power consumption of the front end, the downsampling enables the back end blocks (e.g., the top tracker, bottom tracker, modulation tracker, etc.) to operate using less power as well. Accordingly, certain applications with strict power consumption requirements in sleep or standby modes can leverage such an implementation to reduce power consumption.

Solutions for Lowering Power Consumption: Reducing Size of Storage

Besides power consumption of the circuits used for processing the signal, another factor in power consumption is the amount of data being stored in digital/analog storage (i.e., the buffer for storing the audio stream). Circuits for storing samples consume power, and writing to the storage also consumes power. To address this issue, it is possible to reduce the power consumption of the storage by reducing the size of the storage, i.e., the number of samples being stored by the circuitry. However, some processes which are triggered by the voice activity detector may require more samples in the storage to operate properly.

Figure 12:
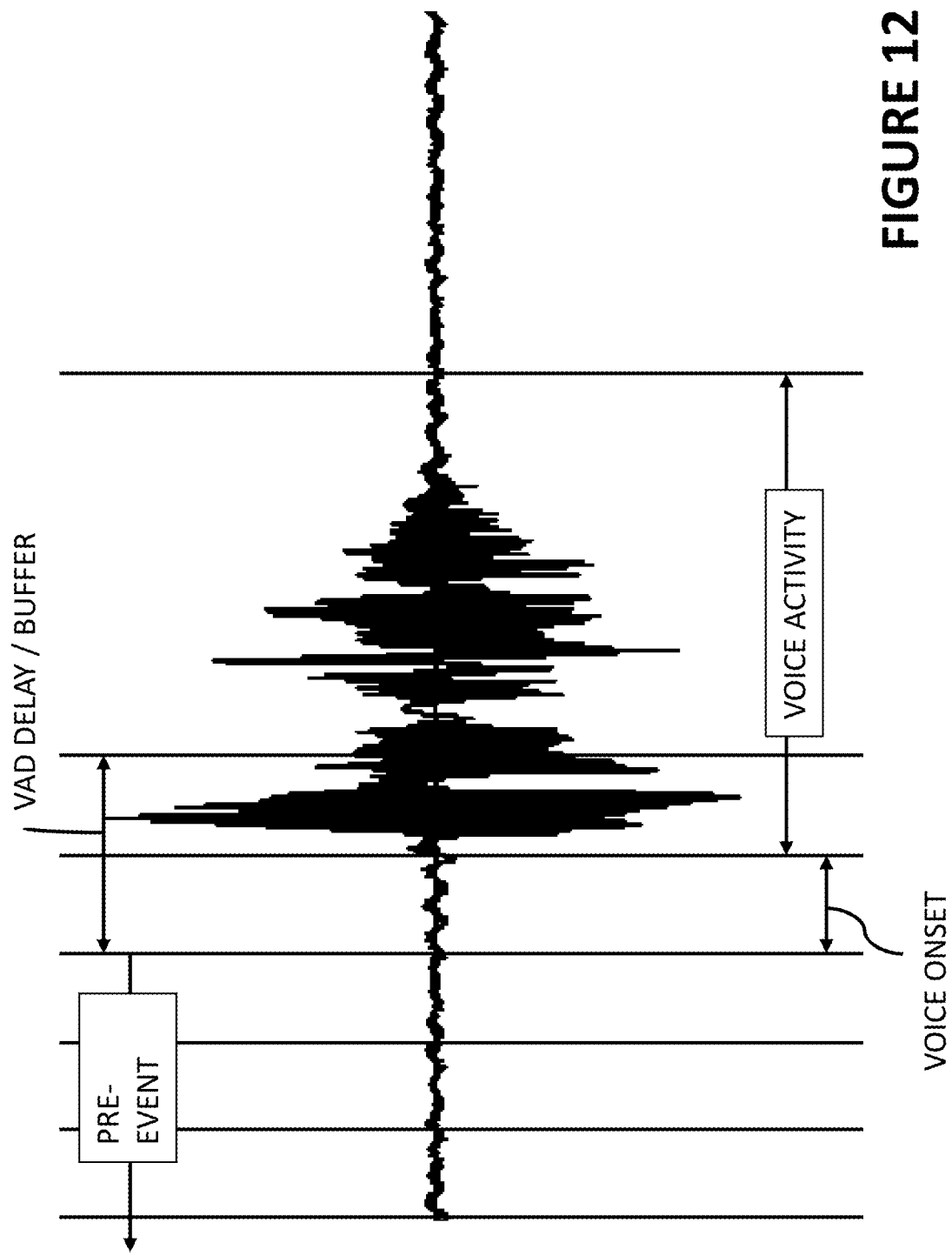
FIG. 12 shows an exemplary waveform of human speech having voice activity and ambient noise, according to some embodiments of the disclosure.

FIG. 12 shows an exemplary waveform of human speech having voice activity and ambient noise, according to some embodiments of the disclosure. In FIG. 12, the waveform shows a period of ambient noise, a period of voice onset (when someone is just about to utter a word), a period of voice activity (shown by the high activity in the waveform), and back to another period of ambient noise. When the voice activity detector detects the presence of voice and triggers a process, such as voice command detection, the samples in the sample storage is flushed and forwarded to the process for further processing. Due to a delay of the voice activity detector, the samples stored in sample storage to be provided to the process for processing corresponds to the period marked by "VAD DELAY/BUFFER". The samples would include some voice onset and some voice activity.

When the sample storage is reduced in size, the number of samples stored decreases and thus reduces the period marked by "VAD DELAY/BUFFER". For some processes being triggered by the voice activity detector, the data samples during the period of voice onset and the period of pre-event can be essential to the proper operation of those processes. In one example, a neural net used to for voice command detection would usually require some amount pre-event data (ambient noise) for the neural net to operate properly.

Figure 13:
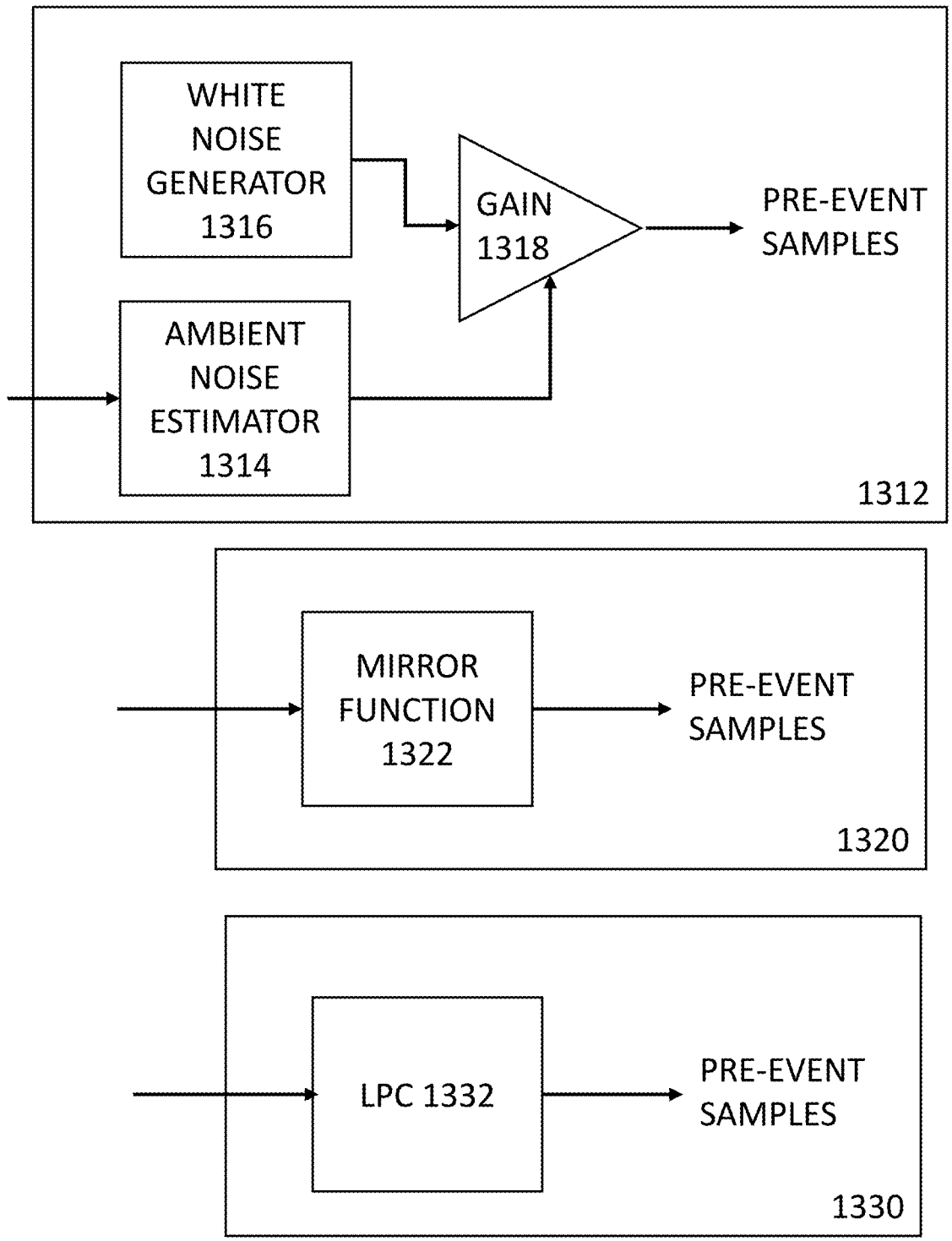
FIG. 13 shows exemplary schemes for generating pre-event samples, according to some embodiments of the disclosure.

Rather than providing a large sample storage, an ambient noise generator can be provided to artificially generate pre-event audio samples based on the first audio stream. The artificially generated pre-event audio samples can be concatenated with the samples stored to ensure proper operation of the process being triggered by the voice activity detector without having to have a large sample storage. FIG. 13 shows exemplary schemes for generating pre-event samples, according to some embodiments of the disclosure. These schemes can be implemented at least in part with analog circuitry, if desired, or be implemented at least in part in the digital domain along with the process that is triggered by the voice activity detector.

In a first scheme 1312, the pre-event samples can be generated by an ambient noise estimator 1314, a white noise generator 1316, and a gain block 1318. The ambient noise estimator 1314 can monitor the audio stream to measure the level of ambient noise. The estimated (average) level of ambient noise can be used to gain the output of the white noise generator 1316 (a white noise signal) using the gain block 1318. This scheme generates white noise which is similar to the ambient noise of the audio stream usable as pre-event samples.

In a second scheme 1320, the pre-event samples can be generated by a mirror function 1322. It is possible to take a set of samples, e.g., from samples just before voice onset and voice activity maintained in the sample storage, and use those samples to artificially generate more noise. In one example, the set of samples can be mirrored or copied 180 degrees several times. This can advantageously artificially produce pre-event samples that would exhibit little discontinuity when the pre-event samples are concatenated with the actual samples.

In a third scheme 1330, the pre-event samples can be generated by a linear predictive coding (LPC) block 1332. LPC provides speech modeling, which can take a noise parameter and synthesize noise that is usable as pre-event samples. The noise parameter can be estimated from the audio stream itself, and thus the LPC block 1332 can advantageously synthesize artificial ambient noise of the audio stream without having to store many samples of the audio stream. In some embodiments, the LPC block 1332 can be implemented as a thin lattice filter (similar to an Nth order Finite Impulse Response filter) to generate the noise parameter usable as input for generating the pre-event samples. Such thin lattice filters can easily be implemented using analog circuitry (i.e., "sampled analog" technology). The noise parameter can then be provided to digital circuitry to generate the pre-event samples.

Using a VAD Channel as a Building Block

Using the Formant VAD channel as a building block, many variations of VAD can be built. The model can be abstracted so that the VAD channels can be programmed using one or more sets of parameters (e.g., parameters which can define the bands of each VAD channel). In a hardware implementation, such set(s) of parameters can be provided in a register file, which is usable by hardware blocks that implement the VAD channels.

Examples of VADs include:
1-channel VAD with no filtering (an energy detector)
1-channel VAD with voice-band filtering for detecting presence of voice
2-channel VAD emphasizing male and female "OH" formants to detect speech (as in "[OH]kay Bobby"), or some other suitable formants to detect the utterance of a pre-determined/specific phrase Providing an Additional Channel to Reduce False Positives In some situations, wideband noise can affect the accuracy of the voice activity detector, because the VAD would detect energy in one or more of the formant channels caused by the wide band noise, thus outputting a false positive result. To address this issue, it is possible to provide an additional channel to check for activity in some out-of-band set of frequencies away from the formants to ensure that the activity detected in the one or more channels is not caused by or related to wide band noise.

In one example, the VAD has three channels, e.g., with two channels emphasizing male and female "OH" formants (as in "[OH]kay Bobby"), and third channel being used to reduce false alarms. False alarms can be triggered by noise or audio activity with wide band energy, which would trigger energy being detected for the Formant VAD channels. To detect such false alarms, it is possible to add an additional channel that detects energy outside of formant bands. If CH0 detects energy for male "OH" formants and CH1 detects energy for female "OH" formants, CH2 can be added to detect energy in out of formant bands, and the outputs of the three channels CH0, CH1, and CH2 can be combined like this: OUT=(CH0 or CH1) and not (CH2).

Figure 16:
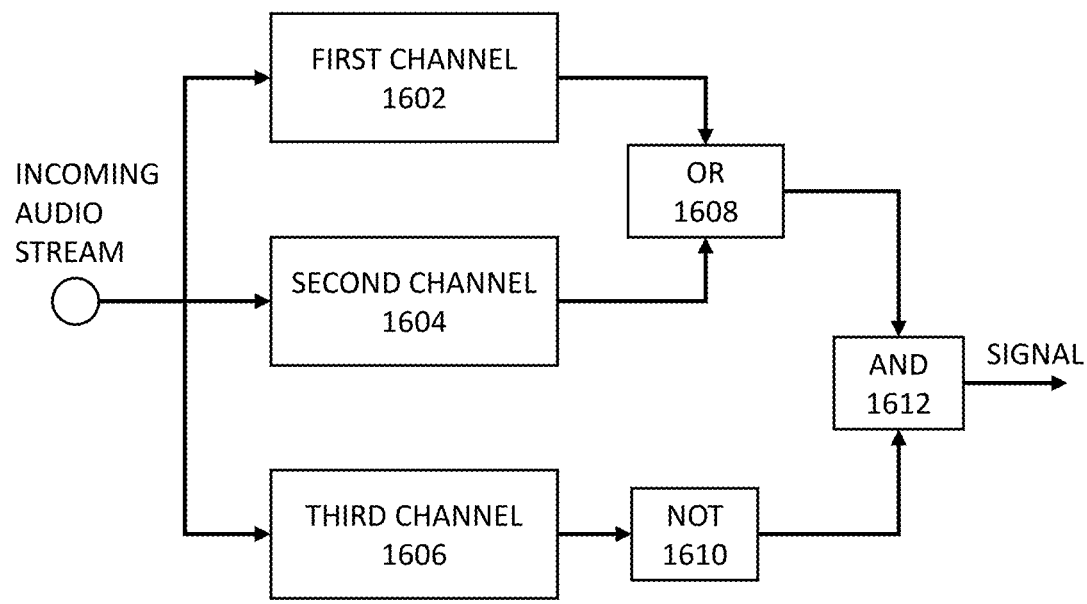
FIG. 16 shows an exemplary three-channel VAD for reducing false positives, according to some embodiments of the disclosure.

FIG. 16 shows an exemplary three-channel VAD for reducing false positives, according to some embodiments of the disclosure. A first channel 1602 and a second channel 1604 can be used to detect voice activity, and a third channel can be used to check if wide band noise is present. The VAD can reduce false positives, by processing, in the first channel 1602, a first audio stream and detecting activity in a first frequency band, wherein the first frequency band includes a first group of formant frequencies characteristic of one or more first vowels. The VAD further process, in a second channel, the first audio stream and detecting activity in a second frequency band, wherein the second frequency band includes a second group of formant frequencies characteristic of one or more second vowels. The VAD further processes, in a third channel, the first audio stream and detecting activity in a third frequency band, wherein the third frequency band is substantially out-of-band with the first frequency band. If significant energy is present in the third frequency band, it is likely that activity detected in the first channel and the second channel is associated with wide band noise. A first decision module can observe the first (voice activity) channel, the second (voice activity) channel, and the third (noise) channel to determine whether voice activity is present in the first audio stream. The first decision module generates an output of the first decision module to indicate whether voice activity is present in the first audio stream.

If the first frequency band is tuned for a particular type of speaker uttering a specific vowel (first vowel sound), and the second frequency band is tuned for another type of speaker utter the same specific vowel, then detecting sufficient activity in the first frequency band and/or the second frequency band, and insufficient activity in the third frequency band indicates voice activity is present in the first audio stream. For instance, outputs indicating whether voice activity is detected in the first channel and whether voice activity is detected in the second channel can be combined using an "OR" operation 1608 to generate an intermediate output. The output indicating whether activity is detected in the third channel is negated using an "NOT" operation 1610. The negated output of the third channel can then be combined with the intermediate output to generate the final output indicating whether voice activity is present.

Figure 17:
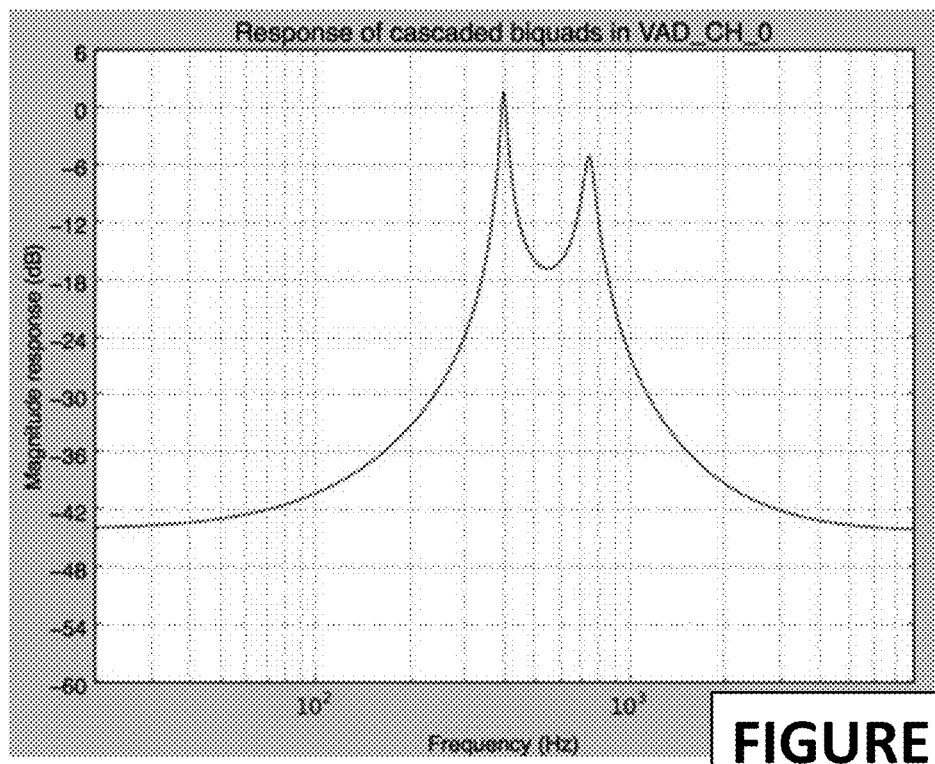
FIG. 17 shows response of an exemplary cascaded biquads for a first channel of a three-channel VAD illustrated in FIG. 16.
Figure 18:
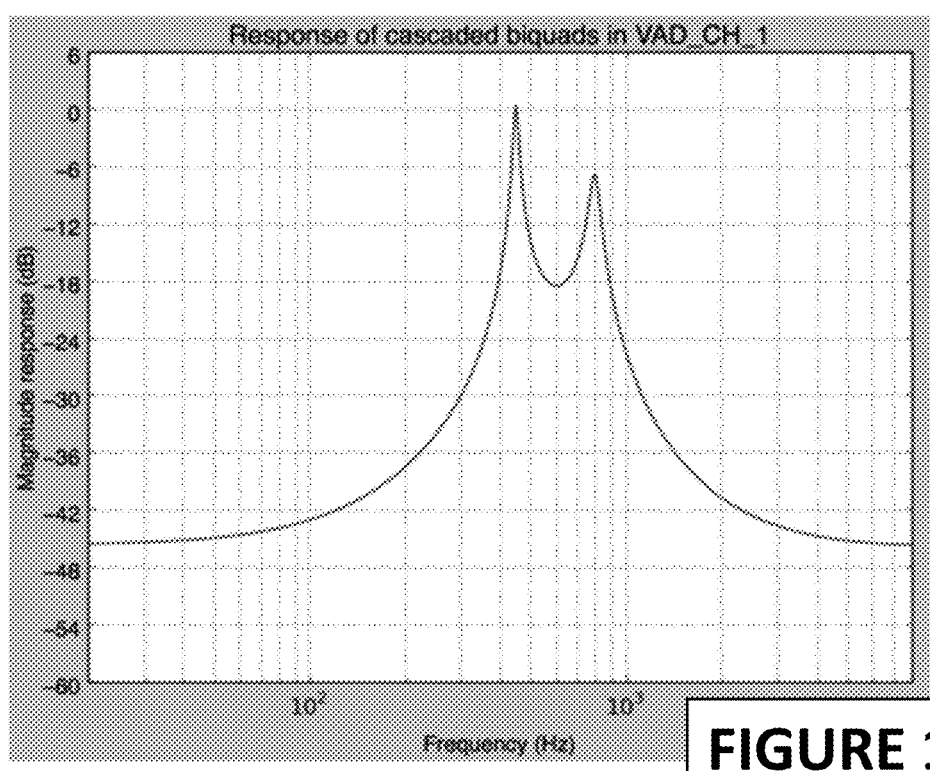
FIG. 18 shows response of an exemplary cascaded biquads for a second channel of a three-channel VAD illustrated in FIG. 16.
Figure 19:
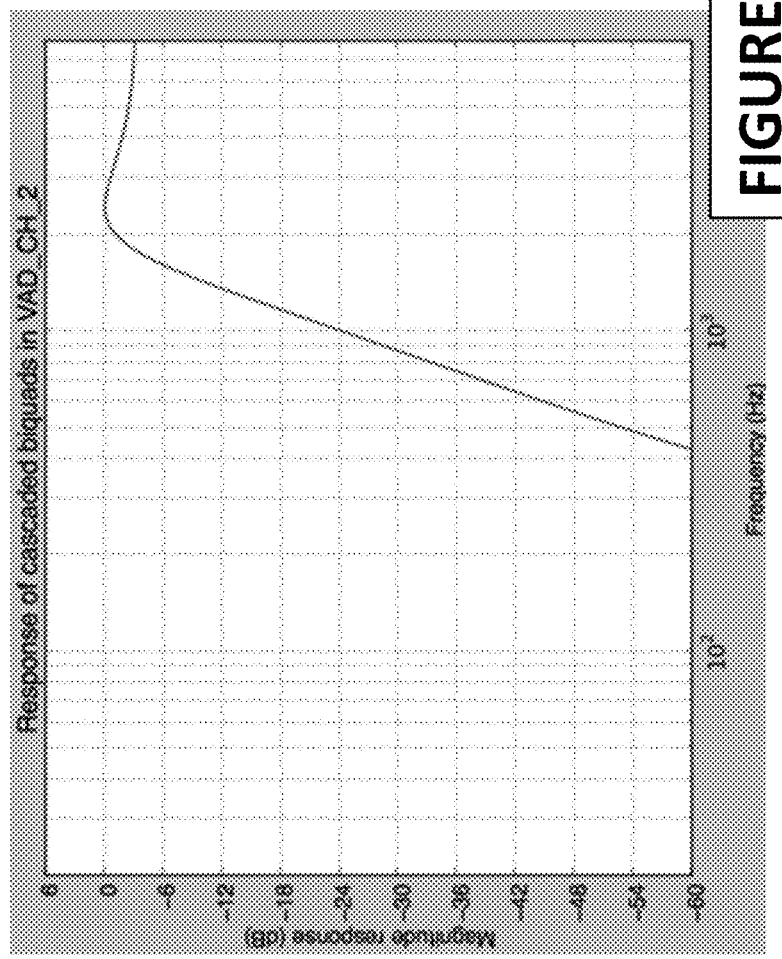
FIG. 19 shows response of an exemplary cascaded biquads for a third channel of a three-channel VAD illustrated in FIG. 16.

Referring back to the example of a three-channel VAD with a first and second channels emphasizing male and female "OH" formants (as in "[OH]kay Bobby") respectively, and third channel being used to reduce false alarms, exemplary biquad filters (e.g., cascaded biquads) used for filtering the audio signal are shown in FIGS. 17-19, respectively. It can be seen that the filter response for the male "OH" formants (FIG. 17) differ slightly from the filter response for the female "OH" formants (FIG. 18). It can also be seen that the filter response for the out-of-band frequencies (outside of formant bands) is configured to detect energy in non-formant frequencies.

Other suitable biquad filters can be used for filtering the audio signal for other frequency bands of interest, depending on the application and VAD design.

If the first frequency band and the second frequency band are tuned to detect (generic) voice activity, with the first frequency band having a range of F1 formant frequencies, and the second frequency band having a range of F2 formant frequencies, then the "OR" operation 1608 can be replaced with an "AND" operation so that the VAD requires sufficient activity detected in both the first channel 1602 and the second channel 1604 to generate a positive intermediate output. The same third channel 1606 can be used to reduce false positives in this setup.

Hardware Implementation

Figure 20:
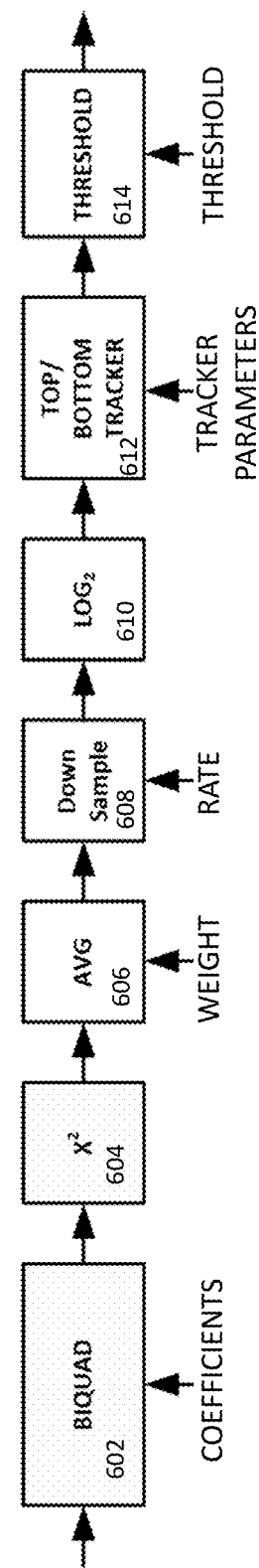
FIG. 20 shows an exemplary signal flow for estimating the energy of an audio stream and analyzing the estimated energy, according to some embodiments of the disclosure.

It is possible to not only implement the model in software embodied in non-transient computer-readable medium, it is possible to implement the model in hardware. Many of the operations of the model can be implemented with hardware blocks. FIG. 20 shows an exemplary signal flow for estimating the energy of an audio stream and analyzing the estimated energy, according to some embodiments of the disclosure. FIG. 20, illustrating the processing stages of the VAD, is similar to FIG. 6, with the crest detector shown as top/bot tracker 612 and threshold block 614.

The VAD takes streaming digital audio and control registers as input and makes its output available as readable status registers. It determines that a voice is probably present in the incoming audio stream by tracking the relative energy in voice frequency bands. Control registers and the hardware architecture are described in further detail in later sections.

Exemplary Biquad Filters Implemented in Hardware

The VAD can implement a (digital) biquad filter (biquad filter 602) to select interesting frequency bands for voice. The calculation is done in Direct Form 1. The transfer function of the biquad can be expressed as:

$$H(z) = \frac{b_0 + b_1 \times z^{-1} + b_2 \times z^{-2}}{1 + a_1 \times z^{-1} + a_2 \times z^{-2}}$$

Figure 21:
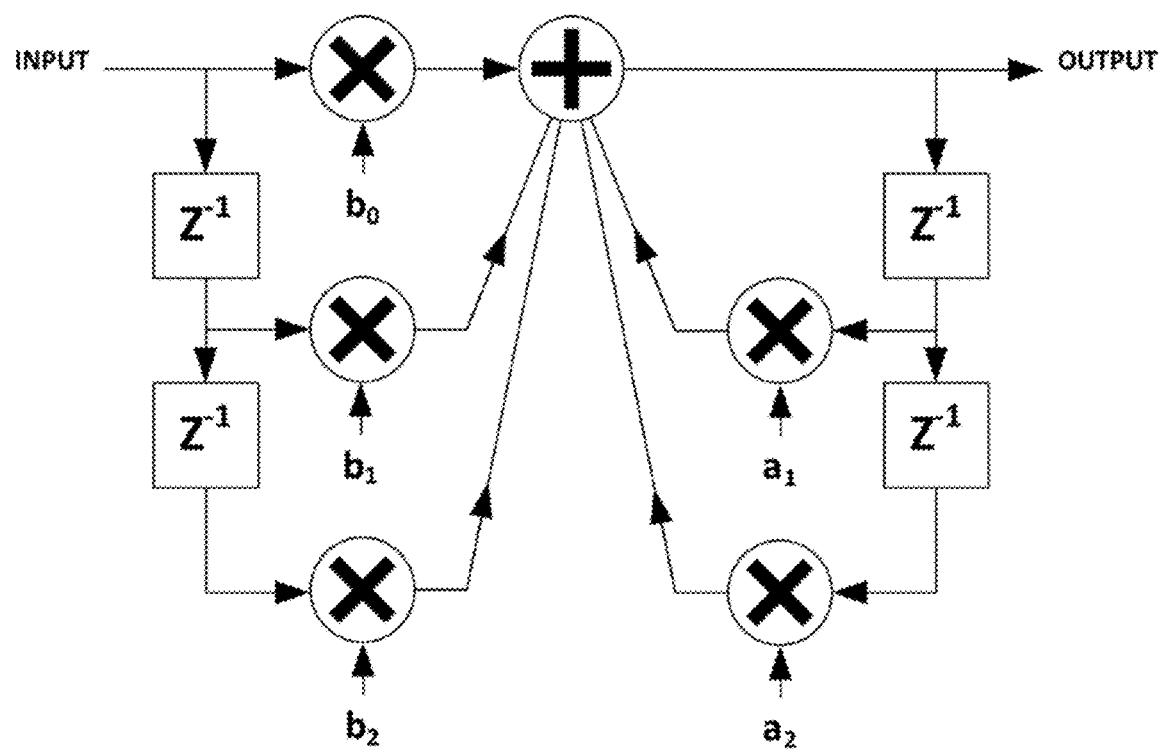
FIG. 21 shows an exemplary biquad filter, according to some embodiments of the disclosure.
Figure 22:
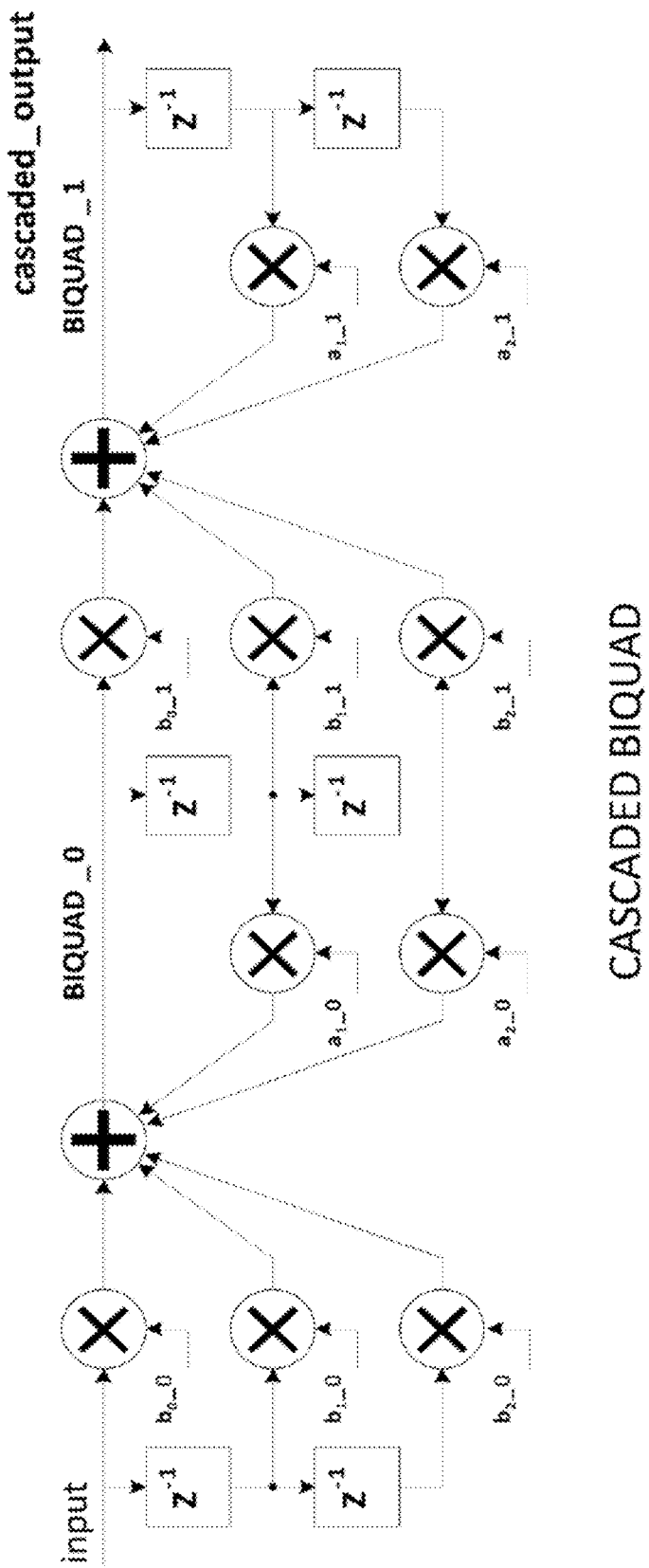
FIG. 22 shows an exemplary cascaded biquad filters, according to some embodiments of the disclosure.

The filter coefficients are limited to the range [−2, +2]. Coefficients can be chosen to implement various filter types and characteristics. Multiple filters can be cascaded within the constraints of the circuit and timing to further modify the filtering options. FIG. 21 shows an exemplary biquad filter, according to some embodiments of the disclosure, and FIG. 22 shows an exemplary cascaded biquad filters (sharing state), according to some embodiments of the disclosure. The resulting hardware comprises circuitry for performing a series of multiplications and additions. The results of the Biquad filter are run simultaneously through both inputs of the multiplier to square the results. In one example, the input is a s4.20 bit signed integer and the output is a 3.20 bit unsigned integer.

Exemplary Averaging Filter Implemented in Hardware

The averaging filter is used to calculate a running average. In one implementation, the averaging filter takes a 23 bit unsigned input and outputs a 24 bit unsigned output but may keep up to 40 bits of internal state for its calculation. It uses an exponential moving average filter. The filter acts much like a leaky bucket or charging capacitor in smoothing the data.

$$\text{sum} = \text{sum} - \left(\frac{\text{sum}}{c}\right) + \left(\frac{\text{input}}{c}\right)$$

Where c is a power of two and division by c is calculated as a right shift. The entire calculation can be carried out by hardware as a series of shifts, subtractions and additions.

Figure 23:
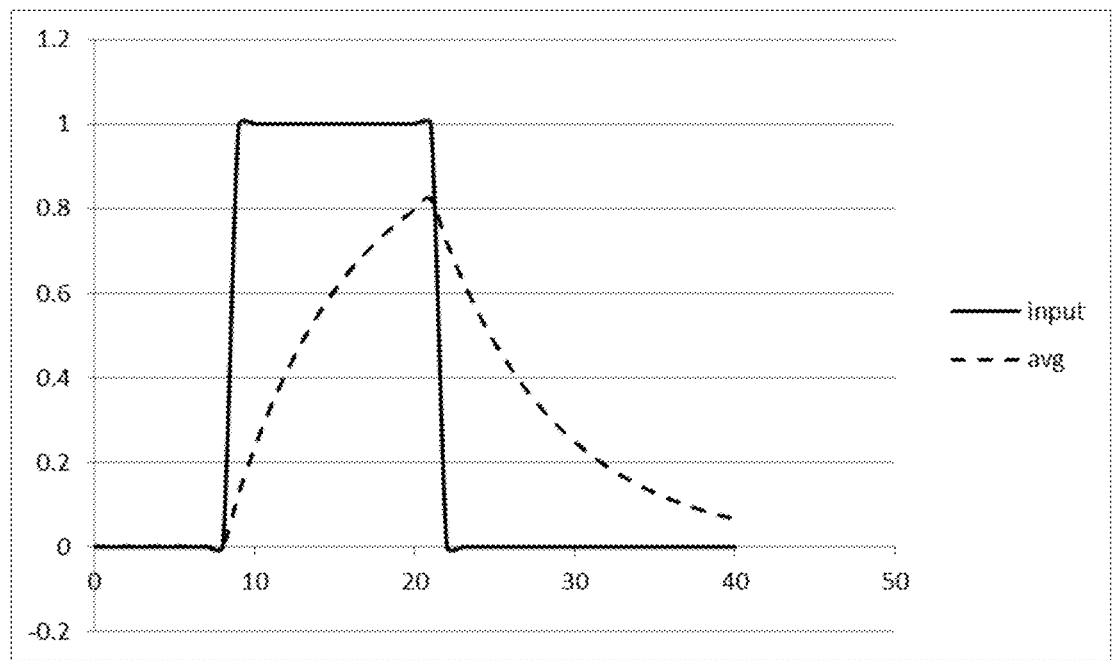
FIG. 23 shows an exemplary response to an averaging filter, according to some embodiments of the disclosure.

FIG. 23 shows an exemplary response to an averaging filter, according to some embodiments of the disclosure. For this exemplary response, an averaging calculation to a pulse using averaging constant $2^3$ is shown. In one implementation, 40 bits for internal accumulator is used because 24 bits come in and 24 bits go out. Extra 16 bits are not for head room but for significance. The least significant bits are truncated.

Exemplary Downsampling or Decimation Implemented in Hardware

Decimation (downsampling module 608) is the process determining which data is kept. The sampling rate is a power of 2 and can vary from 1 to $2^{15}$. Processes upstream of decimation are executed with the occurrence of every audio input sample while decimation and process downstream can occur infrequently.

Exemplary Base Two Logarithm Implemented in Hardware

The decimated output is converted to base two log by an algorithm (in $\log_2$ module 610) that uses squaring and conditional bit insertion to calculate the fractional part while a priority encoder is used to determine the integer part.

Exemplary Top and Bottom Tracker Implemented in Hardware

The minimum/maximum tracker is used to determine the amplitude of the energy in the audio signal with respect to the noise floor. A top tracker follows the peaks while a bottom tracker follows the troughs. Several parameters allow the two trackers to be tuned so that they effectively generate an envelope from which the approximate signal to noise floor can be determined.

Each tracker has a rise rate and fall rate parameter. The top tracker fall rate and the bottom tracker rise rate are accelerated after a specified period of time. The acceleration factor is a power of two multiplier that is shared by both trackers but each has an independent unaccelerated period parameter.

Microsequencer and Register File

Figure 24:
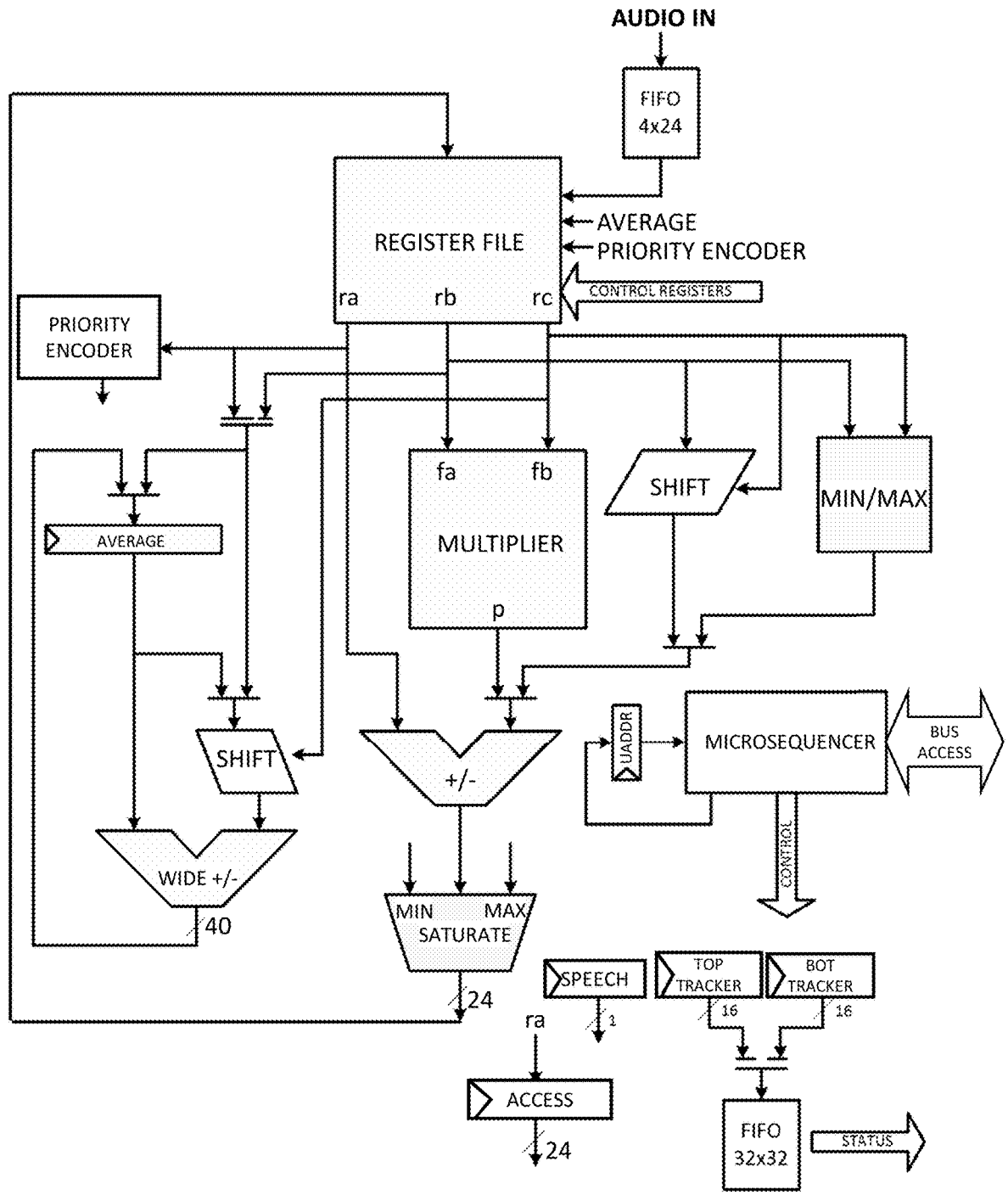
FIG. 24 shows an exemplary hardware architecture for a voice activity detector, according to some embodiments of the disclosure.

FIG. 24 shows an exemplary hardware architecture for a voice activity detector, according to some embodiments of the disclosure. Many of the above mentioned computations can be carried out by dedicated hardware computation blocks. For instance, the hardware computation blocks include a multiplier block, shifting block, min/max block, addition/subtraction (+/−) block, saturate block, average bloc, etc.

By having a microsequencer, instructions and appropriate data (ra, rb, rc) can be loaded to perform the computations for detecting energy in a particular frequency band. The microsequencer is a memory whose state controls the sequencing of the VAD data path. It also includes a field to permit the specification of the next microsequencer address and in some cases, permit the ability to perform conditional branches. The microsequencer has an idle state which causes no state changes. When new audio data is resent the sequencer begins to process it. If new data arrives when the sequencer is not in an idle state a counter of missed data is incremented.

Software and hardware implementations are fully configurable to adapt to different parameters (e.g., different formant bands). Parameters could be tuned on a per-user basis for example, and/or based on ambient noise measurements. A register file is provided to allow parameters to be programmed by a user to adapt the VAD to different application requirements. Furthermore, the register file can allow updating of one or more parameters based on environmental conditions (e.g., level of noise in the environment).

FIG. 25 shows an exemplary register file map for a voice activity detector, according to some embodiments of the disclosure. The register file serves as storage for audio input, parameters for the computations, calculated values as well as mapped locations for CSR's (control status registers), etc.

FIG. 26 shows an exemplary structure for instructions executable by the voice activity detector having a variety of possible opcodes. The first set of bits (opcode) can be used to indicate the opcode for a particular computation/operation. The next set of bits (waddr) can indicate the write address. The next three sets of bits (raddr_a, raddr_b, and raddr_c) can indicate the read addresses (for data). The following table shows the mathematical operation corresponding to the various opcodes.

Exemplary VAD Algorithm and Configuration Parameters

One exemplary VAD has a total of four channels, each of which can be a copy of the main VAD algorithm, and each of which can operate on the same input signal. Each channel has its own set of parameters, and the channels are combined in various ways to form the overall binary output of the VAD. Depending on the implementation, not all channels are used.

Figure 27:
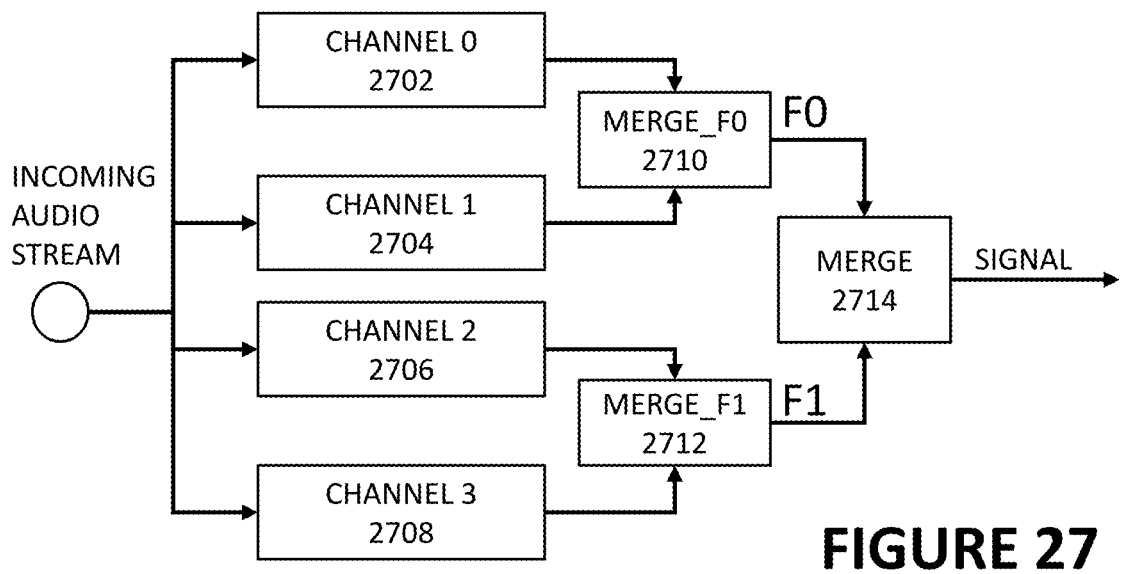
FIG. 27 shows an exemplary four-channel VAD, according to some embodiments of the disclosure.

FIG. 27 shows an exemplary four-channel VAD, according to some embodiments of the disclosure. The VAD includes Channel 0 2702, Channel 1 2704, Channel 2706, and Channel 4 2708. MERGE_F0 2710, MERGE_F1 2712, and MERGE 2714 are generic merging functions (configurable to perform a suitable merging function). Each channel accepts an audio stream and returns a binary-valued output for the merging functions. Channels 0 and 1 are combined to form a signal denoted 'F0', and Channels 2 and 3 are combined to form a signal denoted 'F1'. The signals F0 and F1 are combined to form the overall VAD output. Other suitable merging topologies are envisioned by the disclosure.

Referring to the FIG. 27, any one of the merging functions, MERGE_F0 2710, MERGE_F1 2712, and MERGE 2714, are parameterizable. For instance, the merging function can receive a merge parameter, which can take on an integer value between 0 and 6 inclusive (as an example), indicating how it will combine its various binary inputs. The meaning of the various values for MERGE_F0, MERGE_F1, and MERGE can be identical. Taking MERGE_F0 as typical, the behavior is summarized as:

| MERGE_F0 | Behavior |
|---|---|
| ``` | |
| 0 | CH_0_sp AND CH_1_sp |
| 1 | CH_0_sp AND NOT CH_1_sp |
| 2 | NOT CH_0_sp AND CH_1_sp |
| 3 | NOT CH_0_sp AND NOT CH_1_sp |
| 4 | CH_0_sp OR CH_1_sp |
| 5 | Select CH_0_sp |
| 6 | Select CH_1_sp |
| ``` | |

Exemplary parameters for configuring an illustrative 4-channel VAD

{
   "VAD_CH_0": {
      // Implements a filter that emphasizes male [OH] formants

| Instruction | Opcode | Description |
|---|---|---|
| MULADD | 0000_0000 | w = a + b * c |
| MULADD_WAIT | 0000_0001 | w = a + b * c; wait for sample valid |
| MULADD_NXT | 0000_0010 | w = a + b * c; next sample |
| MULSUB | 0000_0100 | w = a − b * c |
| MULSUB_WAIT | 0000_0101 | w = a − b * c; wait for sample valid |
| MAX | 0000_0110 | w = a + max(b, c) |
| MIN | 0000_0111 | w = a + min(b, c) |
| AVGSUBAVG | 0000_1000 | avg = avg − avg >> c |
| AVGADDREG | 0000_1001 | avg = avg + a >> c |
| SHIFT_LEFT_ADD | 0000_1010 | w = a + b << c |
| SHIFT_RIGHT_ADD | 0000_1011 | w = a + b >> c |
| SHIFT_LEFT_SUB | 0000_1100 | w = a − b << c |
| SHIFT_RIGHT_SUB | 0000_1101 | w = a − b >> c |
| LD_IMM | 0000_1110 | w = instr[17:0] |
| LOG2_MANT | 0000_1111 | w = a + (b * c) >> 2 bit; lg2 = lg2 << 1|2 bit |
| BEQZ | 001X_XXXX | pc = pc + signed(opcode[4:0]) if Z; w = a − b * c |
| BNEQ | 010X_XXXX | pc = pc + signed(opcode[4:0]) if !Z; w = a − b * c |
| BLTE | 011X_XXXX | pc = pc + signed(opcode[4:0]) if N|Z; w = a − b * c |
| BR_IMM | 1XXX_XXXX | pc = opcode[5:0]; w = a + b * c |

```
        "VAD_COEF_A1_0": 1.9692153930664062,
//                         -1    -2
        "VAD_COEF_A2_0": -0.9937629699707031,
//               B0 + B1*z  + B2*z
        "VAD_COEF_B0_0": 0.008350372314453125,
// H(z) = ---------------------
        "VAD_COEF_B1_0": -0.01256561279296875,
//                         -1    -2
        "VAD_COEF_B2_0": 0.004370689392089844,
//               1 - A1*z  - A2*z
        "VAD_COEF_A1_1": 1.8918123245239258,
        "VAD_COEF_A2_1": -0.9769392013549805,
        "VAD_COEF_B0_1": 1.313441276550293,
        "VAD_COEF_B1_1": -1.8918132781982422,
        "VAD_COEF_B2_1": 0.6634969711303711,
        "VAD_AVG_FACTOR": 8,
        // smooths the squared signal before downsampling
        "VAD_DOWNSAMPLE": 10,
        // downsample by a factor of 1024 = 2^10
        "VAD_TRK_ACCEL_FACTOR": 2,
        // acceleration factor for top and bottom trackers, used after
accel count is passed
        "VAD_TRK_BOT_RISE_RATE": 1.0,
        // nominal rise rate for bottom tracker
        "VAD_TRK_BOT_FALL_RATE": 10.0,
        // nominal fall rate for bottom tracker
        "VAD_TRK_BOT_NO_ACCEL_COUNT": 6,
        // if log2 signal is above bottom tracker for >=
2^ACCEL_COUNT frames, accelerate bottom tracker by
ACCEL_FACTOR
        "VAD_TRK_TOP_RISE_RATE": 15.0,
        // nominal rise rate for top tracker
        "VAD_TRK_TOP_FALL_RATE": 10.0,
        // nominal fall rate for top tracker
        "VAD_TRK_TOP_NO_ACCEL_COUNT": 4,
        // if log2 signal is below top tracker for >= 2^ACCEL_COUNT
frames, accelerate top tracker by ACCEL_FACTOR
        "VAD_NOISE_TRESH": -16.0,
        // modulation index (MI) = top tracker – min(bottom tracker,
NOISE_TRESH)
        "VAD_SPEECH_TRESH": 3.5
        // speech detected (SP) = MI >= SPEECH_TRESH
    },
//    "VAD_CH_1": {
        // Implements a filter that emphasizes female [OH] formants
"VAD_AVG_FACTOR": 8,
        "VAD_COEF_A1_0": 1.9627189636230469,
        "VAD_COEF_A1_1": 1.8802242279052734,
        "VAD_COEF_A2_0": -0.993769645690918,
        "VAD_COEF_A2_1": -0.976984977722168,
        "VAD_COEF_B0_0": 0.0069789886474609375,
        "VAD_COEF_B0_1": 1.3128204345703125,
        "VAD_COEF_B1_0": -0.010469436645507812,
        "VAD_COEF_B1_1": -1.8802251815795898,
        "VAD_COEF_B2_0": 0.0036554336547851562,
        "VAD_COEF_B2_1": 0.6641626358032227,
        "VAD_DOWNSAMPLE": 10,
        "VAD_NOISE_TRESH": -16.0,
        "VAD_SPEECH_TRESH": 3.2998046875,
        "VAD_TRK_ACCEL_FACTOR": 2,
        "VAD_TRK_BOT_FALL_RATE": 10.0,
        "VAD_TRK_BOT_NO_ACCEL_COUNT": 6,
        "VAD_TRK_BOT_RISE_RATE": 1.0,
        "VAD_TRK_TOP_FALL_RATE": 10.0,
        "VAD_TRK_TOP_NO_ACCEL_COUNT": 4,
        "VAD_TRK_TOP_RISE_RATE": 15.0
//    },
//
//    "VAD_CH_2": {
        // Implements a highpass filter with a 1.8kHz cutoff frequency
        "VAD_AVG_FACTOR": 8,
        "VAD_COEF_A1_0": 1.1313657760620117,
        "VAD_COEF_A1_1": 1.1313657760620117,
        "VAD_COEF_A2_0": -0.5187530517578125,
        "VAD_COEF_A2_1": -0.5187530517578125,
        "VAD_COEF_B0_0": 0.5584163665771484,
        "VAD_COEF_B0_1": 0.5584163665771484,
        "VAD_COEF_B1_0": -1.1129636764526367,
        "VAD_COEF_B1_1": -1.1129636764526367,
        "VAD_COEF_B2_0": 0.5584163665771484,
        "VAD_COEF_B2_1": 0.5584163665771484,
        "VAD_DOWNSAMPLE": 10,
        "VAD_NOISE_TRESH": -16.0,
        "VAD_SPEECH_TRESH": 3.5,
        "VAD_TRK_ACCEL_FACTOR": 2,
        "VAD_TRK_BOT_FALL_RATE": 10.0,
        "VAD_TRK_BOT_NO_ACCEL_COUNT": 6,
        "VAD_TRK_BOT_RISE_RATE": 1.0,
        "VAD_TRK_TOP_FALL_RATE": 10.0,
        "VAD_TRK_TOP_NO_ACCEL_COUNT": 4,
        "VAD_TRK_TOP_RISE_RATE": 15.0
//    },
//       "VAD_CH_3" could also be included
        "VAD_MERGE_F0": 4,      // F0_sp = CH_0_sp OR CH_1_sp
        "VAD_MERGE_F1": 5,      // F1_sp = CH_2_sp
        "VAD_MERGE": 1          // Overall output = F0_sp AND NOT
                                    F1_sp
        "_comment000": "Formant ID 00 (Male OH - 400Hz and 750Hz
peaks) in CH0",
        "_comment001": "Formant ID 01 (Female OH - 450Hz and 800Hz
peaks) in CH1",
        "_comment002": "Highpass filter (1.8kHz cutoff) in CH2 for false
alarm reduction",
        "_comment003": "Overall Detection = (VAD_CH_0_sp OR
VAD_CH_1_sp) AND NOT (VAD_CH_2_sp)",
        "_comment004": "",
        "_comment005": "Possible integr values for VAD_MERGE_F0:",
        "_comment006": " 0: VAD_CH_0_sp AND VAD_CH_1_sp",
        "_comment007": " 1: VAD_CH_0_sp AND NOT
VAD_CH_1_sp",
        "_comment008": " 2: NOT VAD_CH_0_sp AND
VAD_CH_1_sp",
        "_comment009": " 3: NOT VAD_CH_0_sp AND NOT
VAD_CH_1_sp",
        "_comment010": " 4: VAD_CH_0_sp OR VAD_CH_1_sp",
        "_comment011": " 5: VAD_CH_0_sp",
        "_comment012": " 6: VAD_CH_1_sp",
        "_comment013": "",
        "_comment014": "Possible integr values for VAD_MERGE_F1:",
        "_comment015": " 0: VAD_CH_2_sp AND VAD_CH_3_sp",
        "_comment016": " 1: VAD_CH_2_sp AND NOT
VAD_CH_3_sp",
        "_comment017": " 2: NOT VAD_CH_2_sp AND
VAD_CH_3_sp",
        "_comment018": " 3: NOT VAD_CH_2_sp AND NOT
VAD_CH_3_sp",
        "_comment019": " 4: VAD_CH_2_sp OR VAD_CH_3_sp",
        "_comment020": " 5: VAD_CH_2_sp",
        "_comment021": " 6: VAD_CH_3_sp",
        "_comment022": "",
        "_comment023": "Possible integr values for VAD_MERGE:",
        "_comment024": " 0: VAD_MERGE_F0_sp AND
VAD_MERGE_F1_sp",
        "_comment025": " 1: VAD_MERGE_F0_sp AND NOT
VAD_MERGE_F1_sp",
        "_comment026": " 2: NOT VAD_MERGE_F0_sp AND
VAD_MERGE_F1_sp",
        "_comment027": " 3: NOT VAD_MERGE_F0_sp AND NOT
VAD_MERGE_F1_sp",
        "_comment028": " 4: VAD_MERGE_F0_sp OR
VAD_MERGE_F1_sp",
        "_comment029": " 5: VAD_MERGE_F0_sp",
        "_comment030": " 6: VAD_MERGE_F1_sp"
}
```

Detecting Sequential Vowels Sounds

In previously mentioned, the frequency bands can be adjusted based on one or more pre-defined utterance/phrase. Specifically, the frequency band of a particular channel can be tuned for one or more specific vowels of interest. For instance, various voice activated programs triggers when a user utters or say a particular keyword or phrase, e.g., "Hello, Meera", "Help me, Bobi", "OK, Sami", "Alina" etc. The frequency bands of interest can be tuned to detect the first vowel sounds of these phrases (e.g., "Eyy", "El", "Oo", "Aa", etc.) based on the specific formants associated with the first vowel sounds. Further to tuning a frequency bands of interest based on a first vowel sound of a particular word or phrase, the frequency band(s) of interest can also be tuned to detect second, third, or further vowel sounds of the particular word or phrase so increase the accuracy of detecting the word or phrase being uttered.

The process of detecting sequential vowel involves providing a plurality of VAD channels, which can be implemented as sequential utterance detectors. Consider an example of detecting a word "Okay", which comprises "Oh" and followed by "Kay" in time. A sequential utterance detector may be configured to detect not only "Oh" but that the detector can detect "Oh" followed by "Kay" in time.

Figure 28:
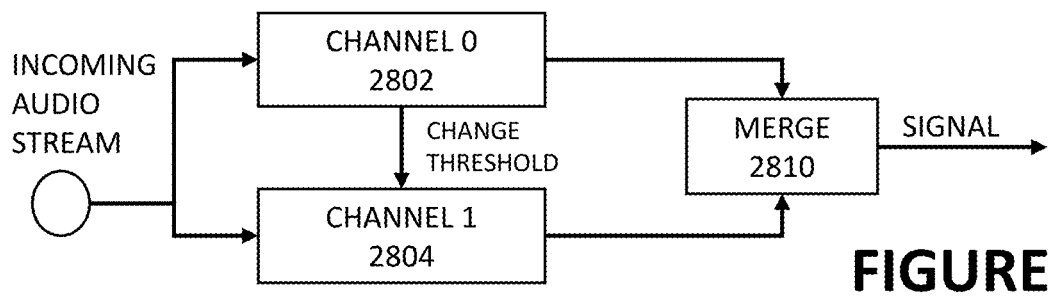
FIG. 28 shows an exemplary two-channel VAD with sequential vowel sounds detection, according to some embodiments of the disclosure.

FIG. 28 shows an exemplary two-channel VAD with sequential vowel sounds detection, according to some embodiments of the disclosure. In this example, Channel 0 2802 can process a first audio stream ("incoming audio stream") and detect activity in a first frequency band, wherein the first frequency band includes a first group of formant frequencies characteristic of a first vowel. For instance, this first frequency band can be tuned to detect formant frequencies characteristic of an "Oh" vowel sound. Channel 1 2804 can processing the first audio stream and detect activity in a second frequency band, wherein the second frequency band includes a second group of formant frequencies characteristic of a second vowel. For instance, this first frequency band can be tuned to detect formant frequencies characteristic of a "Kay" vowel sound (or "Ay"). A first decision module, e.g., merge 2810, can observe Channel 0 2802 and Channel 1 2804 to determine whether voice activity is present in the first audio stream. For instance, merge 2810 can include an "AND" operation for detecting whether voice activity is in both channels. The first decision module, e.g., merge 2810, can generate an output to indicate whether voice activity is present in the first audio stream.

Several mechanisms can be implemented to allow the two-channel VAD (or a suitable multichannel VAD) to, e.g., detect "Oh" followed by "Kay" in time. In one example, the output of the first channel (e.g., Channel 0 2802) can be used as a gate for a second channel (e.g., Channel 1 2804) with an appropriate relaxation time. Referring back to the example of detecting "Oh" followed by "Kay", with a multichannel VAD, a sub-set of channels can detect "Oh" and another sub-set of channels to detect "Kay". The output of "Oh" detector can be used as a gate (e.g., in first decision module, or merge 2810) to the output of the "Kay" detector, which can ensure that the multichannel VAD must first have detected an "Oh" before the output of "Kay" detector can trigger the final output of the first decision module (or merge 2810) to become positive. Advantageously, the multichannel VAD can detect the "Okay" word, with improved accuracy over a VAD for detecting "Oh" only. Furthermore, the gating mechanism can reduce false positives. Preferably, the "Oh" detection gate has a time out so that the gating mechanism is only temporary. In some cases, the time-out can be weighted in time, such that the closer to "Oh" the "Kay" approximate detection gets, the easier it is for the "Kay" detector to pass (i.e., allowing final output of the first decision module (or merge 2810) to become positive).

As an alternative or in addition to providing a gating mechanism, dynamic detection thresholds of a particular channel can be adjusted to provide a similar functionality. This relationship is illustrated by the "CHANGE THRESHOLD" arrow between Channel 0 2802 and Channel 0 2804 of FIG. 28. For instance, in response to detecting activity in the first channel, an output of the first channel can adjust a threshold parameter of the second channel appropriately, so that, e.g., "Oh" detection output can make it easier to detect a "Kay" close in time. The "Oh" detection can temporarily relax the "Kay" threshold (e.g., decrease the threshold used for the modulation index), and over time tighten the threshold as time passes further away from the "Oh" detection event (e.g., increases the threshold).

Figure 29:
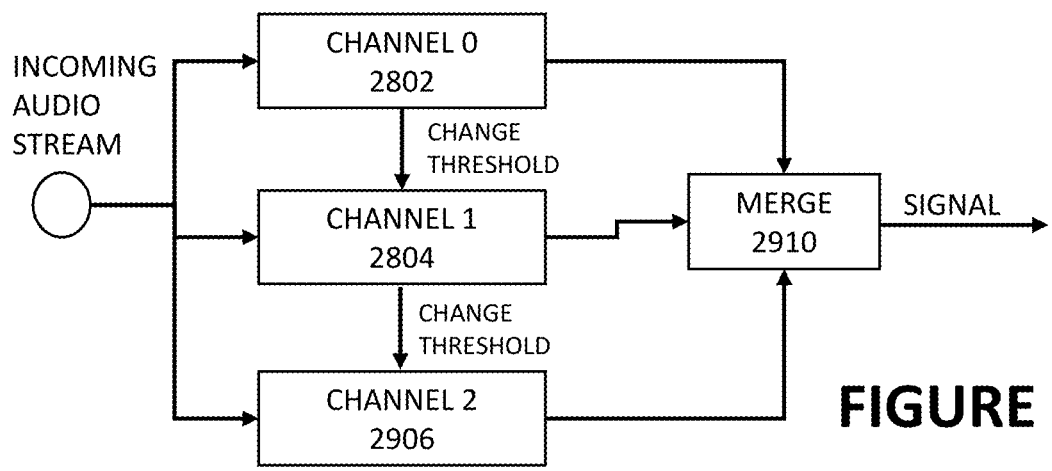
FIG. 29 shows an exemplary three-channel VAD with sequential vowel sounds detection, according to some embodiments of the disclosure.

The basic two-channel scheme illustrated in FIG. 28 can further be expanded to use multiple sub-channel detectors, such that we can detect a longer sequence of utterances. FIG. 29 shows an exemplary three-channel VAD with sequential vowel sounds detection, according to some embodiments of the disclosure. In addition to the two channels, Channel 0 2802 and Channel 1 2804 of FIG. 28, the multichannel VAD of FIG. 29 includes one or more further channels (e.g., Channel 2 2906) for processing the first audio stream and detecting activity in a one or more further frequency bands respectively, wherein each of the one or more frequency bands include a respective group of formant frequencies characteristic of a respective vowel. For instance, Channel 2 2906 can process the first audio stream and detect activity in a third frequency band.

For instance, the multi-channel VAD can be tuned to detect the word "Analog", which comprises three sequential vowel sounds "An", "Ah", and "Log. The first frequency band can be tuned to include formant frequencies corresponding to "An". The second frequency band can be tuned to include formant frequencies corresponding to "Ah". The third frequency band can be tuned to include formant frequencies corresponding to "Log".

A decision module, e.g., merge 2910, can observes the first channel, the second channel, and the one or more further channels (e.g., Channel 0 2802, Channel 1 2804, Channel 2 2906) to determine whether voice activity is present in the first audio stream. The gating mechanism and/or dynamic threshold adjustment described in relation to FIG. 28 can also be applied to the scheme in FIG. 29. Referring back to the example of detecting the word "Analog" having "An", "Ah", "Log", in some implementations, the gating mechanism and/or the dynamic threshold adjustment mechanism can be applied to sequentially detect "An" then "Ah" then "Log".

In some embodiments, a majority voting mechanism can be applied to the outputs of the three channels (e.g., Channel 0 2802, Channel 1 2804, Channel 2 2906). Specifically, the decision module (e.g., merge 2910) can generate an output of the first decision module to indicate voice activity is present in response to observing voice activity being present for a sufficient number of channels. For instance, the decision module can monitor, for a given period of time, whether a majority of the channels (e.g., two out of three channels, or some other sufficient number of channels) generated a positive output indicating voice activity has been detected (at any point in time during the given period of time). Referring back to the example of detecting the word "Analog" having "An", "Ah", "Log", in some implementations, the decision module (e.g., merge 2910) can implement majority detection (with "??" being any utterance):

"An" then "Ah" then "??"=="Analog" detected
"??" then "Ah" then "log"=="Analog" detected
"An" then "??" then "log"=="Analog" detected
Else no "Analog" detected With a majority voting mechanism, a final output is positive indicating voice activity is detected when a majority of the channels output a positive output. The majority voting mechanism, in some implementations, can be combined with the gating and/or dynamic threshold adjustment mechanism.

Replacing Biquad Filters with FIR Filters

For sequential vowel detection, the overall multichannel VAD is dependent on the frequency bands of interest, as well as a timing aspect, where the timing aspect is being taken into account using, e.g., gating or dynamic threshold adjustment. In some embodiments, the multichannel VAD can take the frequency bands of interest and the timing aspect into account by replacing biquad filters in the channels with Finite Impulse Response (FIR) filters. The tabs of the FIR filter can be tuned to a specific frequency band of interest, and the tabs can also be tuned with a particular delay and even decay so that the timing aspect can be taken into account (e.g., allowing an incoming audio stream having "An", "Ah", and "Log" to generate a strong response). An FIR filter with appropriate coefficients tuned to the expected timing of the sequential vowel sounds would peak FIR when the incoming audio stream has a match in frequency and time. In some embodiments, a first Finite Impulse Response filter in a first channel filters a first audio stream and a second Finite Impulse Response filter in a second channel filters the first audio stream. The first and second Finite Impulse Response filter comprises tabs which respond to (1) formant frequencies characteristic of the first and second vowel respectively, and (2) a timing relationship between the first and second vowel in a predetermined word or phrase. One implementation consideration of an FIR filter is the size of the FIR filter, which can hurt the power profile of overall VAD. An FIR filter can be implemented with Sampled Analog Technology to reduce power and size of the circuitry.

Variations and Implementations

While the examples disclosed herein describe a voice activity detector each having two channels for detecting activity in a first frequency band and a second frequency band, it is envisioned that a voice activity detector can include one or more extra channels for other frequency bands of interest. The decision module may be modified to further determine whether a voice is present or not present by observing the one or more extra channels. For instance, the decision module can observe whether there is simultaneous activity in the first frequency band and another frequency band associated with the extra channel to determine whether a voice is present. The use of one or more extra channels, although increases complexity and power consumption slightly, can be suitable for applications which may require slightly higher accuracy for voice activity detection.

The present disclosure has been focused on binary detection results. However, it is envisioned that an output of the detection module and/or the output of a voice detection apparatus combining outputs of the detection modules does not necessarily have to be binary. For instance, the output indicating whether voice activity detection can have discrete levels indicating varying probabilities that voice activity is present. In some cases, the output can take on continuous values indicating varying probabilities that voice activity is present.

For simplicity, the present disclosure described embodiments focusing on F1 and F2 frequencies, and providing a first frequency band (a first frequency band of interest) and a second frequency band (second frequency band of interest) to detect activity resulting from F1 and F2 frequencies of various sounds. However, it is noted that the first frequency band and the second frequency bands are not necessarily always being used to detect activity associated with F1 and F2 frequencies respectively. For instance, the frequency bands detecting activity in frequency bands of interest can be used to detect activity associated with other formant frequencies such as F3, F4 and F5. Some frequency bands of interest can even be provided to detect activity associated with a plurality of formant frequencies. In some cases, the audio electronics may not support using those higher formant frequencies, however, since higher frequencies can often be cut-off.

In certain contexts, the features discussed herein can be applicable signals processing systems having one or more audio capturing devices generating audio streams which a voice activity detector can process to detect voice activity. Moreover, certain embodiments discussed above can be provisioned in areas such as medical devices, instrumentation, wired or wireless communications, automotive systems, consumer electronics, professional audio equipment, healthcare equipment, and any suitable context where a low complexity voice activity detector can provide utility. In one example, a wireless (e.g., Bluetooth) headset can provide the voice activity detector described herein to turn on a radio or transmitter for transmitting audio to a paired device. When no voice activity is detected, the wireless headset can reduce power consumption by leaving a radio off, or operate the radio in a low power or dormant mode. A very similar approach can be used to reduce power for audio/voice sensing units operating with limited power by only turning on a radio or transmitter if voice activity is detected with the low-complexity voice activity detector described herein.

In one example embodiment, any number of electrical circuits of the FIGURES may be implemented on a board of an associated electronic device. The board can be a general circuit board that can hold various components of the internal electronic system of the electronic device and, further, provide connectors for other peripherals (e.g., an audio capturing device). More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the voice activity detection functionalities may be implemented in one or more silicon cores in Application Specific Integrated Circuits (ASICs), Field Programmable Gate Arrays (FPGAs), and other semiconductor chips. In some embodiments, the voice activity detector can be provided using integrated circuits in a compact form to be embedded within a microphone, or devices with a small form factor.

In the discussions of the embodiments above, the components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples of the present disclosure and appended claims (if any). The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended examples of the present disclosure and appended claims (if any). The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data (e.g., real-time audio stream data). Certain embodiments can relate to multi-DSP signal processing, floating point processing, signal/control processing, fixed-function processing, microcontroller applications, etc. Alternatively or in addition to digital circuitry, some parts of the low-complexity voice activity detector can be implemented with filters having analog circuitry based on sampled analog technology.

While the examples described herein are focused on detecting human voice activity, the same principles of formant filtering can be applied to animal sounds as well. Many animal voices have complex vocal sounds which have characteristic formants as well that can be used to trigger voice detection. For instance, birds (e.g., chickens, turkeys, parrots, parakeets, finches, song birds, etc.) can produce sounds with characteristic formants. By providing suitable bandpass filters and channels, formant filtering can be used to detect bird sounds (or bird speech). Generally speaking, animals with a vocal tract would produce sounds that have formants, i.e., which are directly related to the resonant frequencies of the vocal tract. Other examples include dogs, cats, etc. Such a technology could be used for activating pet/animal/livestock monitoring systems (e.g., cameras, microphones, etc.). In some cases, the technology can be used to trigger a process when animal voice is detected (e.g., for tagging audio streams, automation in agricultural automation). For instance, automation in farming such as dairy farms, poultry farms, etc., can use animal sounds as an input to control robotics which processes the livestock. The animal sounds can trigger robotics and enable the robotics to know the state of the livestock. In one example, lights can turn on and feed can be automatically delivered when animal sounds are detected (e.g., indicating the animals are awake and hungry). In another example, different mechanisms of automatic milking systems can be triggered in the presence of cow sounds.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to voice activity detection, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended examples of the present disclosure and appended claims (if any). Note that all optional features of the apparatus described above may also be implemented with respect to the method or process described herein and specifics in the examples may be used anywhere in one or more embodiments.

The invention claimed is:

1. A voice activity detector, comprising:
a first channel to:
  receive an audio stream and filter the audio stream to a first frequency band of the audio stream, wherein the first frequency band includes a first group of formant frequencies corresponding to a vowel;
  track peaks of energy of the audio stream within the first frequency band to produce a first top tracker value;
  track quiet periods of energy of the audio stream within the first frequency band to produce a first bottom tracker value;
  produce a first modulation index based on a difference between the first top tracker value and the first bottom tracker value; and
  compare the first modulation index to a first threshold to determine whether activity exists within the first frequency band;
a second channel to:
  receive the audio stream and filter the audio stream to a second frequency band of the audio stream, wherein the second frequency band includes a second group of formant frequencies corresponding to the vowel;
  track peaks of energy of the audio stream within the second frequency band to produce a second top tracker value;
  track quiet periods of energy of the audio stream within the second frequency band to produce a second bottom tracker value;
  produce a second modulation index based on a difference between the second top tracker value and the second bottom tracker value; and
  compare the second modulation index to a second threshold to determine whether activity exists within the second frequency band; and
a decision module coupled to the first channel and the second channel, the decision module to determine whether voice activity is present in the audio stream based on whether the first channel determines that activity exists within the first frequency band and whether the second channel determines that activity exists within the second frequency band.

2. The voice activity detector of claim 1, wherein to determine whether voice activity is present in the audio stream includes to determine that voice activity is present in the audio stream based on the first channel determining that activity exists within the first frequency band and the second channel determining that activity exists within the second frequency band.

3. The voice activity detector of claim 1, wherein:
the first channel includes:
  a first filter to filter the audio stream to the first frequency band;
  a first energy estimating module to determine an amount of energy within the first frequency band; and
  a first crest detector to update an indication of whether the first channel determines that activity exists within the first frequency band based on the comparison of the first modulation index to the first threshold; and
the second channel includes:
  a second filter to filter the audio stream to the second frequency band;
  a second energy estimating module to determine an amount of energy within the second frequency band; and
  a second crest detector to update an indication of whether the second channel determines that activity exists within the second frequency band based on the comparison of the second modulation index to the second threshold.

4. The voice activity detector of claim 1, wherein frequencies within the first group of formant frequencies and frequencies within the second group of formant frequencies are selected based on a native tongue, a language, a dialect, or accent of an expected speaker.

5. The voice activity detector of claim 1, further comprising a third channel to receive the audio stream and filter the audio stream to a third frequency band of the audio stream, wherein the third frequency band includes a third group of formant frequencies that are out-of-band with the first group of formant frequencies and the second group of formant frequencies, wherein the third channel is to determine whether activity exists within the third frequency band, and wherein the decision module is coupled to the third channel and is to determine whether voice activity is present in the audio stream further based on whether activity exists within the third frequency band.

6. The voice activity detector of claim 5, wherein to determine whether voice activity is present in the audio stream includes to determine that voice activity is not present in the audio stream based on the third channel determining that activity exists within the third frequency band.

7. The voice activity detector of claim 5, further comprising:
OR logic coupled to the first channel and the second channel, the OR logic to perform an OR operation with an output of the first channel and an output of the second channel; and
AND logic coupled to the third channel and the OR logic, the AND logic to perform an AND operation with a result of the OR operation output by the OR logic and an output of the third channel, and to provide a result of the AND operation to the decision module.

8. The voice activity detector of claim 1, wherein to:
track the peaks of energy of the audio stream within the first frequency band includes to:
  set the first top tracker value equal to a value of a positive peak of the energy of the audio stream within the first frequency band; and
  decrease the first top tracker value when a value of the energy of the audio stream within the first frequency band is below a current value of the first top tracker value; and
track the quiet periods of energy of the audio stream within the first frequency band includes to:
  set the first bottom tracker value equal to a value of a negative peak of the energy of the audio stream within the first frequency band; and
  increase the first bottom tracker value when the value of the energy of the audio stream within the first frequency band is above a current value of the first bottom tracker value.

9. The voice activity detector of claim 8, wherein to:
decrease the first top tracker value includes to:
  decrease the first top tracker value at a first rate for a first time period where the value of the energy of the audio stream within the first frequency band is below the current value of the first top tracker value; and decrease the first top tracker value at a second rate for a second time period where the value of the energy of the audio stream within the first frequency band is below the current value of the first top tracker value, the second rate being greater than the first rate; and increase the first bottom tracker value includes to:
increase the first bottom tracker value at a third rate for a third time period where the value of the energy of the audio stream within the first frequency band is above the current value of the first bottom tracker value; and
increase the first bottom tracker value at a fourth rate for a fourth time period where the value of the energy of the audio stream within the first frequency band is above the current value of the first bottom tracker value, the fourth rate being greater than the third rate.

10. A system, comprising:
a voice activity detector to:
track peaks of energy of an audio stream within a first frequency band to produce a first top tracker value, the first frequency band including, a first group of formant frequencies corresponding to a vowel;
track quiet periods of energy of the audio stream within the first frequency band to produce a first bottom tracker value;
produce a first modulation index based on a difference between the first top tracker value and the first bottom tracker value;
determine whether activity exists within the first frequency band of the audio stream based on a comparison of the first modulation index with a first threshold;
track peaks of energy of the audio stream within a second frequency band to produce a second top tracker value, the second frequency band including a second group of formant frequencies corresponding to the vowel;
track quiet periods of energy of the audio stream within the second frequency band to produce a second bottom tracker value;
produce a second modulation index based on a difference between the second top tracker value and the second bottom tracker value;
determine whether activity exists within the second frequency band of the audio stream based on a comparison of the second modulation index with a second threshold; and
determine whether voice activity is present in the audio stream based on whether activity exists within the first frequency band and whether activity exists within the second frequency band; and
a processor coupled to the voice activity detector, the processor to initiate a process of the system based on the determination whether activity is present in the audio stream.

11. The system of claim 10, wherein the processor is to initiate the process in response to the voice activity detector determining that voice activity is present in the audio stream.

12. The system of claim 10, wherein the voice activity detector includes:
a first channel to receive the audio stream and determine whether activity exists within the first frequency band of the audio stream;
a second channel to receive the audio stream and determine whether activity exists within the second frequency band of the audio stream; and
a decision module coupled to the first channel and the second channel, the decision module to determine whether voice activity is present in the audio stream based on whether the first channel determines that activity exists within the first frequency band and whether the second channel determines that activity exists within the second frequency band.

13. The system of claim 10, wherein the voice activity detector is further to determine whether activity exists within a third frequency band of the audio stream, the third frequency band being out-of-band with the first frequency band and the second frequency band, wherein to determine whether voice activity is present in the audio stream is further based on whether activity exists within the third frequency band.

14. The system of claim 13, wherein to determine whether voice activity is present in the audio stream comprises to determine that voice activity is not present in the audio stream based on determining that activity exists within the third frequency band.

15. The system of claim 10, wherein to:
track the peaks of energy of the audio stream within the first frequency band includes to:
set the first top tracker value equal to a value of a positive peak of the energy of the audio stream within the first frequency band; and
decrease the first top tracker value when a value of the energy of the audio stream within the first frequency band is below a current value of the first top tracker value;
track the quiet periods of energy of the audio stream within the first frequency band includes to:
set the first bottom tracker value equal to a value of a negative peak of the energy of the audio stream within the first frequency band; and
increase the first bottom tracker value when the value of the energy of the audio stream within the first frequency band is above a current value of the first bottom tracker value;
track the peaks of energy of the audio stream within the second frequency band includes to:
set the second top tracker value equal to a value of a positive peak of the energy of the audio stream within the second frequency band; and
decrease the second top tracker value when a value of the energy of the audio stream within the second frequency band is below a current value of the second top tracker value; and
track the quiet periods of energy of the audio stream within the second frequency band includes to:
set the second bottom tracker value equal to a value of a negative peak of the energy of the audio stream within the second frequency band; and
increase the second bottom tracker value when the value of the energy of the audio stream within the second frequency band is below a current value of the second bottom tracker value.

16. A procedure for identifying voice activity in an audio stream, comprising:
determining, by a first channel, whether activity exists within a first frequency band of the audio stream, wherein the first frequency band includes a first group of formant frequencies corresponding to a vowel, wherein determining whether activity exists within the first frequency band comprises:

tracking peaks of energy of the audio stream within the first frequency band to produce a first top tracker value;

tracking quiet periods of energy of the audio stream within the first frequency band to produce a first bottom tracker value;

determining a difference between the first top tracker value and the first bottom tracker value to produce a first modulation index; and compare the first modulation index with a first threshold;

determining, by a second channel, whether activity exists within a second frequency band of the audio stream, wherein the second frequency band includes a second group of formant frequencies corresponding to the vowel, the second group of formant frequencies being separate from the first group of formant frequencies, wherein determining whether activity exists within the second frequency band comprises:

tracking peaks of energy of the audio stream within the second frequency band to produce a second top tracker value;

tracking quiet periods of energy of the audio stream within the second frequency band to produce a second bottom tracker value;

determining a difference between the second top tracker value and the second bottom tracker value to produce a second modulation index; and compare the second modulation index with a second threshold; and determining, by a decision module, whether voice activity exists in the audio stream based on the determination of whether activity exists within the first frequency band and the determination of whether activity exists within the second frequency band.

17. The procedure of claim 16, wherein determining whether voice activity exists in the audio stream comprises determining that voice activity exists in the audio stream based on a determination that activity exists within the first frequency band and a determination that activity exists within the second frequency band.

18. The procedure of claim 16, further comprising determining, by a third channel, whether activity exists within a third frequency band of the audio stream, wherein the third frequency band is out-of-band with the first frequency band and the second frequency band, and wherein determining whether voice activity exists in the audio stream is further based on whether activity exists within the third frequency band.

19. The procedure of claim 18, wherein the determining whether voice activity exists in the audio stream comprises determining that voice activity does not exist in the audio stream based in response to determining that activity exists within the third frequency band.

20. The procedure of claim 16, wherein:

determining the difference between the first top tracker value and the first bottom tracker value comprises:

subtracting the first bottom tracker value from the first top tracker value; and outputting, as the first modulation index, either zero or a result of the subtracting of the first bottom tracker value from the first top tracker value based on the result of the subtracting of the first bottom tracker value from the first top tracker value; and determining the difference between the second top tracker value and the second bottom tracker value comprises:

subtracting the second bottom tracker value from the second top tracker value; and outputting, as the second modulation index, either zero or a result of the subtracting of the second bottom tracker value from the second top tracker value based on the result of the subtracting of the second bottom tracker value from the second top tracker value.

* * * * *